United States Patent
Sakaguchi et al.

(10) Patent No.: US 10,222,875 B2
(45) Date of Patent: Mar. 5, 2019

(54) APPARATUS, SYSTEM, AND METHODS FOR INTERFACING WITH A USER AND/OR EXTERNAL APPARATUS BY STATIONARY STATE DETECTION

(71) Applicant: SomniQ, Inc., Menlo Park, CA (US)

(72) Inventors: Rikko Sakaguchi, Menlo Park, CA (US); Hidenori Ishikawa, Mountain View, CA (US); Ken Yano, Tokyo (JP); Takuya Nishimoto, Hiroshima (JP)

(73) Assignee: SOMNIQ, INC., Menlo Park, CA (US)

( * ) Notice: Subject to any disclaimer, the term of this patent is extended or adjusted under 35 U.S.C. 154(b) by 0 days.

(21) Appl. No.: 15/373,989

(22) Filed: Dec. 9, 2016

(65) Prior Publication Data
US 2017/0168595 A1 Jun. 15, 2017

Related U.S. Application Data

(60) Provisional application No. 62/266,423, filed on Dec. 11, 2015.

(51) Int. Cl.
*G06F 3/041* (2006.01)
*G06F 3/0346* (2013.01)
(Continued)

(52) U.S. Cl.
CPC .......... *G06F 3/0346* (2013.01); *G06F 1/1684* (2013.01); *G06F 1/1686* (2013.01);
(Continued)

(58) Field of Classification Search
CPC ...... G06F 3/0346; G06F 3/017; G06F 3/0304; G06F 3/16; G06F 3/041; G06F 3/016;
(Continued)

(56) References Cited

U.S. PATENT DOCUMENTS

D221,818 S 9/1971 Chardack
D249,091 S 8/1978 Burtis
(Continued)

FOREIGN PATENT DOCUMENTS

JP S59132718 7/1984
JP H11232012 8/1999
(Continued)

OTHER PUBLICATIONS

U.S. Appl. No. 29/548,309, entitled "Portable Electronic Device", filed Dec. 11, 2015.
(Continued)

*Primary Examiner* — Jonathan A Boyd
(74) *Attorney, Agent, or Firm* — Dorsey & Whitney LLP

(57) ABSTRACT

Methods and apparatuses for interfacing with a user based on the detection of a state, such as a stationary state, of the apparatus and providing a response based on the state of the apparatus are described herein. An example method of interfacing with a user includes: detecting a user in proximity of an apparatus; entering a first mode of the apparatus responsive to detection of the user in proximity; receiving motion data from one or more sensors of the apparatus responsive to movement of the apparatus; and detecting a stationary state of the apparatus based on the motion data; and entering a second mode responsive to detection of the stationary state.

22 Claims, 11 Drawing Sheets

(51) Int. Cl.
  *G06F 3/01* (2006.01)
  *G06F 3/03* (2006.01)
  *G06F 3/16* (2006.01)
  *G06F 1/16* (2006.01)
  *G06F 1/3231* (2019.01)
  *G06T 1/00* (2006.01)

(52) U.S. Cl.
  CPC .......... *G06F 1/1694* (2013.01); *G06F 1/1698* (2013.01); *G06F 1/3231* (2013.01); *G06F 3/017* (2013.01); *G06F 3/0304* (2013.01); *G06F 3/041* (2013.01); *G06F 3/16* (2013.01); *G06F 3/016* (2013.01); *G06F 2203/0384* (2013.01); *G06T 1/0007* (2013.01); *G06T 2207/10016* (2013.01); *G06T 2207/30196* (2013.01); *Y02D 10/173* (2018.01)

(58) Field of Classification Search
  CPC ... G06F 2203/0384; G06T 2207/30196; G06T 2207/10016; G06T 1/0007
  See application file for complete search history.

(56) References Cited

U.S. PATENT DOCUMENTS

| | | |
|---|---|---|
| D262,464 S | 12/1981 | Vernon, Jr. |
| D286,124 S | 10/1986 | Dempsey |
| D297,328 S | 8/1988 | Nozo et al. |
| 4,804,945 A | 2/1989 | Millet |
| D303,356 S | 9/1989 | Couch |
| D324,106 S | 2/1992 | Greenblatt |
| D325,582 S | 4/1992 | Emmons et al. |
| D327,690 S | 7/1992 | Ogawa et al. |
| D331,060 S | 11/1992 | Emmons et al. |
| 5,243,430 A | 9/1993 | Emmons |
| D339,986 S | 10/1993 | Garouste et al. |
| D345,507 S | 3/1994 | Granai |
| D363,569 S | 10/1995 | Lai |
| D382,255 S | 8/1997 | Moffatt |
| D382,261 S | 8/1997 | Kaneko et al. |
| D396,852 S | 8/1998 | Chao |
| D408,285 S | 4/1999 | Favre |
| D408,590 S | 4/1999 | Litton |
| D414,190 S | 9/1999 | Pinchuk |
| D418,125 S | 12/1999 | Jobs et al. |
| D430,358 S | 8/2000 | Papiernik |
| D433,994 S | 11/2000 | Jobs et al. |
| D443,726 S | 6/2001 | Faillant-Dumas |
| D443,727 S | 6/2001 | Faillant-Dumas |
| D463,991 S | 10/2002 | Curry et al. |
| D465,469 S | 11/2002 | Heath |
| D465,733 S | 11/2002 | Hill |
| D467,037 S | 12/2002 | Bakic |
| 6,558,165 B1 | 5/2003 | Curry |
| D479,366 S | 9/2003 | Goswell |
| D480,396 S | 10/2003 | Buckner |
| D489,706 S | 5/2004 | Chen |
| D494,633 S | 8/2004 | Nussberger et al. |
| D496,004 S | 9/2004 | Borsboom |
| D503,692 S | 4/2005 | Basta |
| D518,030 S | 3/2006 | Lin |
| D518,819 S | 4/2006 | Gray |
| D521,512 S | 5/2006 | Kunzi et al. |
| D526,916 S | 8/2006 | Oas |
| D527,008 S | 8/2006 | Greenrod |
| D541,228 S | 4/2007 | Thursfield |
| D558,767 S | 1/2008 | Solland |
| D561,022 S | 2/2008 | Terrasi |
| D578,711 S | 10/2008 | Burrow et al. |
| D579,937 S | 11/2008 | Cohen |
| D595,670 S | 7/2009 | Glassman et al. |
| D595,734 S | 7/2009 | Son |
| D596,815 S | 7/2009 | Baek |
| D597,524 S | 8/2009 | Jha |
| D601,564 S | 10/2009 | Maeno |
| D602,858 S | 10/2009 | Ellis et al. |
| D602,915 S | 10/2009 | Song et al. |
| D602,916 S | 10/2009 | Won |
| D606,973 S | 12/2009 | Jha |
| D607,347 S | 1/2010 | Goh et al. |
| D610,479 S | 2/2010 | Shi |
| D619,562 S | 7/2010 | Jha |
| D626,147 S | 10/2010 | Goddard |
| D627,306 S | 11/2010 | Charleux |
| D628,190 S | 11/2010 | Jha |
| D632,265 S | 2/2011 | Choi et al. |
| D632,281 S | 2/2011 | Hoehn et al. |
| D636,380 S | 4/2011 | Valeur |
| D636,760 S | 4/2011 | Cheng |
| D637,306 S | 5/2011 | Feuerabend et al. |
| D643,412 S | 8/2011 | Brady et al. |
| 8,089,458 B2 | 1/2012 | Barney et al. |
| D654,866 S | 2/2012 | Rautiainen |
| D656,034 S | 3/2012 | Wanders |
| D672,465 S | 12/2012 | Sherman |
| D683,636 S | 6/2013 | Levanen |
| D683,843 S | 6/2013 | Cudworth |
| D685,790 S | 7/2013 | Tang |
| D687,009 S | 7/2013 | Song et al. |
| D695,258 S | 12/2013 | Hauser et al. |
| D700,080 S | 2/2014 | Broadbent et al. |
| D700,571 S | 3/2014 | Guccione et al. |
| D700,904 S | 3/2014 | Miller et al. |
| D717,674 S | 11/2014 | Vu et al. |
| D719,165 S | 12/2014 | Hill et al. |
| D724,060 S | 3/2015 | Ahn et al. |
| D726,924 S | 4/2015 | Tseng et al. |
| D729,773 S | 5/2015 | Salojarvi et al. |
| D730,891 S | 6/2015 | Wang |
| D731,334 S | 6/2015 | Fiedler et al. |
| D731,579 S | 6/2015 | Bart et al. |
| D732,033 S | 6/2015 | Sakaguchi |
| D738,376 S | 9/2015 | Sakaguchi |
| D743,645 S | 11/2015 | Lee |
| 9,189,090 B2 | 11/2015 | Tanaka |
| 9,218,055 B2 | 12/2015 | Sakaguchi et al. |
| D746,886 S | 1/2016 | Breazeal et al. |
| D747,984 S | 1/2016 | Zhao et al. |
| D752,531 S | 3/2016 | Xu et al. |
| D755,750 S | 5/2016 | Chen |
| D756,955 S | 5/2016 | Wagner |
| D763,967 S | 8/2016 | Kujawski et al. |
| D768,114 S | 10/2016 | Hou et al. |
| D769,846 S | 10/2016 | Hong et al. |
| D770,417 S | 11/2016 | Chen |
| D773,947 S | 12/2016 | Scarcella et al. |
| D774,717 S | 12/2016 | Choi et al. |
| D776,820 S | 1/2017 | Rouillac et al. |
| D777,331 S | 1/2017 | Jayalath et al. |
| D778,876 S | 2/2017 | Zhang |
| D778,878 S | 2/2017 | De Vaal |
| D783,838 S | 4/2017 | Zhao et al. |
| 2002/0055383 A1 | 5/2002 | Onda et al. |
| 2004/0250218 A1 | 12/2004 | Wecker et al. |
| 2006/0028429 A1 | 2/2006 | Kanevsky et al. |
| 2007/0135689 A1 | 6/2007 | Masamichi et al. |
| 2007/0247439 A1 | 10/2007 | Daniel et al. |
| 2009/0021380 A1 | 1/2009 | Higuchi et al. |
| 2010/0123588 A1 | 5/2010 | Cruz Hernandez |
| 2010/0144436 A1 | 6/2010 | Marks et al. |
| 2012/0062483 A1 | 3/2012 | Ciesla et al. |
| 2012/0280917 A1 | 11/2012 | Toksvig et al. |
| 2013/0063611 A1 | 3/2013 | Papakipos et al. |
| 2014/0112556 A1 | 4/2014 | Kalinli-Akbacak |
| 2014/0139466 A1* | 5/2014 | Sakaguchi ............... G06F 3/011 345/173 |
| 2014/0285435 A1* | 9/2014 | Bezos ................... G06F 1/1626 345/156 |
| 2014/0324749 A1 | 10/2014 | Peters et al. |
| 2015/0026613 A1 | 1/2015 | Kwon et al. |
| 2015/0268737 A1 | 9/2015 | Gelfond et al. |

(56) References Cited

U.S. PATENT DOCUMENTS

| | | |
|---|---|---|
| 2016/0062496 A1 | 3/2016 | Sakaguchi et al. |
| 2016/0246373 A1 | 8/2016 | Sakaguchi et al. |
| 2018/0203512 A1 | 7/2018 | Sakaguchi et al. |

FOREIGN PATENT DOCUMENTS

| | | |
|---|---|---|
| JP | 2001-025984 A | 1/2001 |
| JP | 2007034544 | 2/2007 |
| JP | 2007058844 | 3/2007 |
| JP | 2009026125 | 2/2009 |
| JP | 2012075089 | 4/2012 |
| JP | 2012509145 | 4/2012 |
| KR | 2009-0093286 | 9/2009 |
| KR | 2012-0092316 | 8/2012 |
| WO | 0237249 A2 | 5/2002 |
| WO | 2007034388 A2 | 3/2007 |
| WO | 2009036327 A1 | 3/2009 |
| WO | 2013055380 A1 | 4/2013 |
| WO | 2016137797 A1 | 9/2016 |
| WO | 2017100641 A1 | 6/2017 |

OTHER PUBLICATIONS

Cai, Yang, "Empathic Computing", Ambient Intelligence in Everyday Life, LNAI 3864, Jan. 2006, 67-95.
International Search Report and Written Opinion received for PCT Appl. PCT/US2016/065924 dated Mar. 2, 2017.

\* cited by examiner

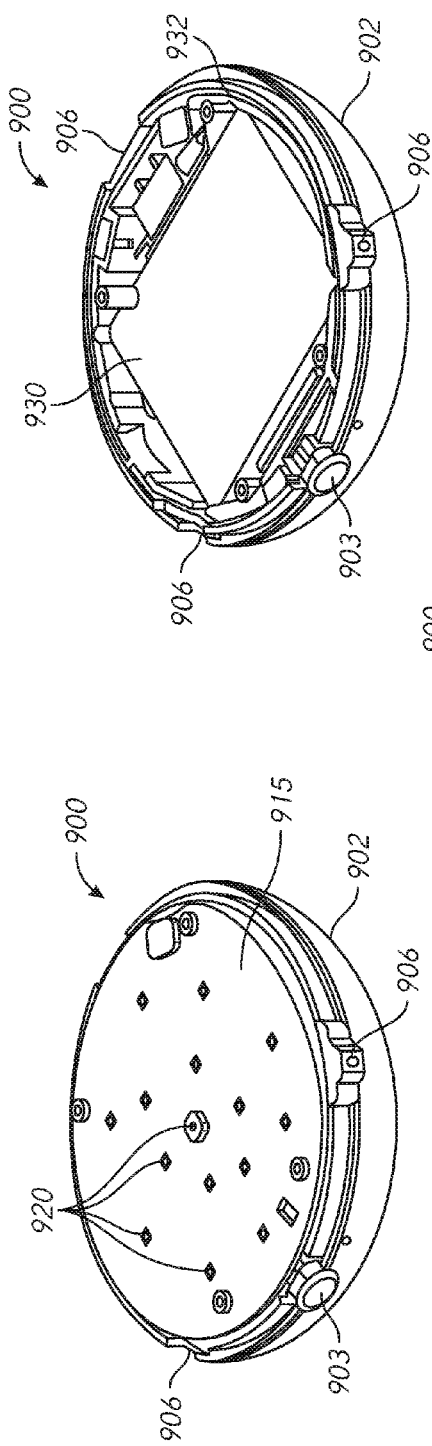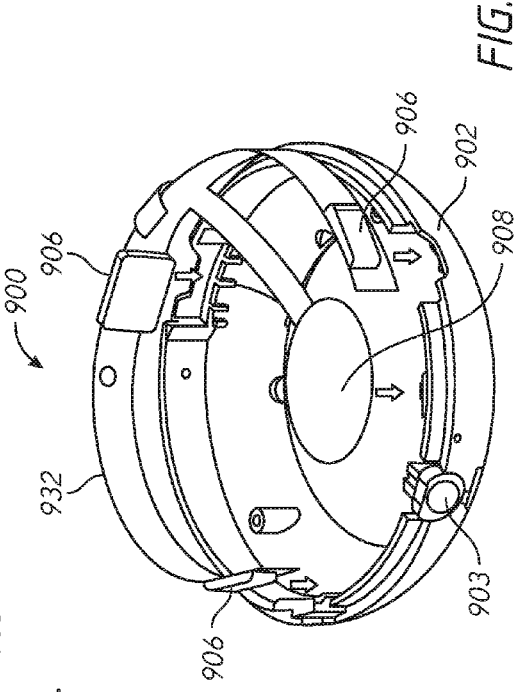

| Cycle | 1 | 2 | 3 | 4 | 5 | 6 | 7 | 8 | 9 | 10 | Stillness Level |
|---|---|---|---|---|---|---|---|---|---|---|---|
| Sequence I | Rough | Calm | Still | Still | Calm | Calm | Still | Calm | Still | Still | High |
| Sequence II | Rough | Calm | Calm | Calm | Calm | Calm | Calm | Calm | Calm | Calm | Low |

APPARATUS, SYSTEM, AND METHODS FOR INTERFACING WITH A USER AND/OR EXTERNAL APPARATUS BY STATIONARY STATE DETECTION

CROSS-REFERENCE TO RELATED APPLICATION(S)

This application claims the benefit under 35 U.S.C. § 119 of the earlier filing date of U.S. Provisional Application Ser. No. 62/266,423, filed Dec. 11, 2015, the entire contents of which are hereby incorporated by reference in their entirety for any purpose

TECHNICAL FIELD

This invention relates to an apparatus, system and method for detection of states of an apparatus, including apparatuses and methods for interfacing with a user based on the detection of a state, such as a stationary state, of the apparatus and providing a response based on the state of the apparatus.

BACKGROUND

Conventional man machine interfaces (e.g., computer user interfaces) operate by the detection of specific commands from the user. The detection is typically performed by the user submitting specific inputs via input devices configured to receive the specific user input. More recently, user interfaces have been developed in which the detection of specific gestures or voice commands of a user are correlated by the user interface into specific commands that the interface is programmed to receive. Typically an input by a user requires some action (e.g., inputting a command, a particular gesture or a particular voice command) for the machine to receive a command. For example, in some of the conventional methods, the user directly provides one or more entries through input devices (e.g., keys, buttons, a mouse, a touch screen, a microphone, etc.) to signal one command or a sequence of commands to explicitly control the machine (e.g., an electronic apparatus). In other examples, the commands are received in the form of a particular gesture or user motion. These types of conventional interfaces require the user's attention and consciousness to the input of the commands. As such, conventional interfaces typically require the user's specific attention to the task to explicitly control the machine, which may be disruptive, cumbersome, or annoying for the user. Thus, user interfaces which enable interaction with an electronic apparatus in a more natural and implicit manner may be desirable.

BRIEF DESCRIPTION OF THE DRAWINGS

FIG. 2B-2E are perspective views of portions of the apparatus in FIG. 2A.

DETAILED DESCRIPTION

Various embodiments of the present disclosure will be explained below in detail with reference to the accompanying drawings. The following detailed description refers to the accompanying drawings that show, by way of illustration, specific aspects and embodiments in which the present invention may be practiced. These embodiments are described in sufficient detail to enable those skilled in the art to practice the present invention. Other embodiments may be utilized, and structure, logical and electrical changes may be made without departing from the scope of the present invention. The various embodiments disclosed herein are not necessary mutually exclusive, as some disclosed embodiments can be combined with one or more other disclosed embodiments to form new embodiments.

Figure 1:
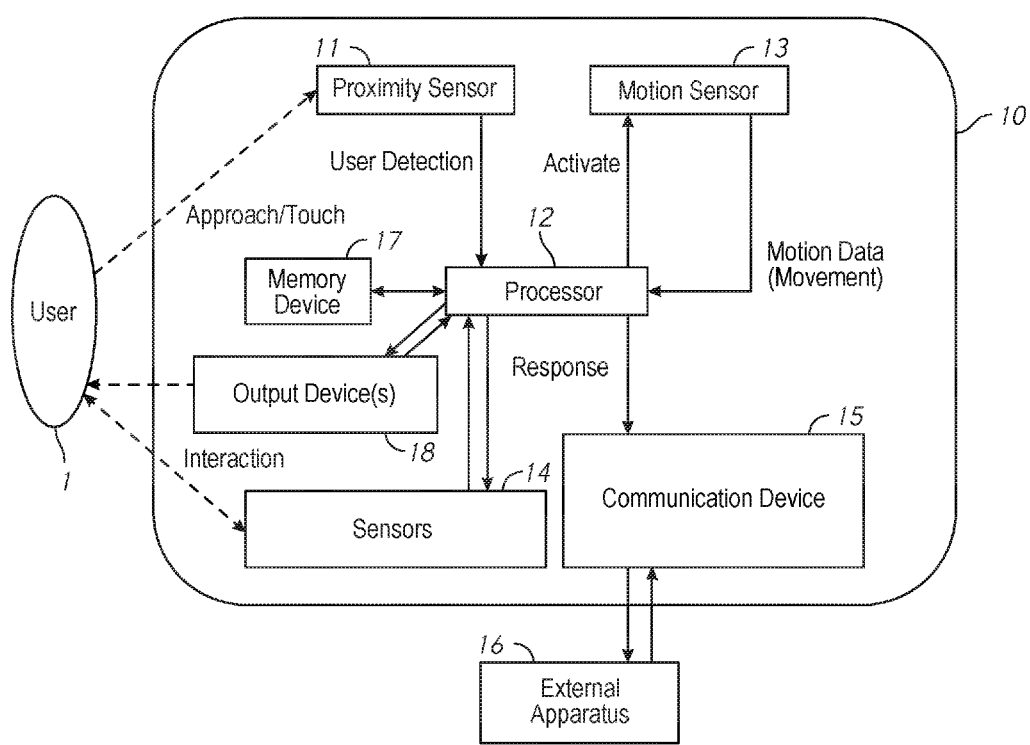
FIG. 1 is a simplified block diagram of an apparatus in accordance with an embodiment of the present disclosure.

FIG. 1 is a simplified block diagram of an apparatus 10 in accordance with an embodiment of the present disclosure. For example, the apparatus 10 may include a processor 12, a proximity sensor 11 and a motion sensor 13. While the application refers to "a" processor, "a" proximity sensor, and "a" motion sensor, it will be understood that any of these components (e.g., the processor, proximity sensor and/or the motion sensor) can include one or more individual processors, which may operate in parallel, and/or one or more sensors of the same or different type, the sensor data from which may be used to provide the data needed for performing the functions of the apparatus described herein. The proximity sensor 11 may detect a user 1 in proximity of the electronic apparatus 10. For example, the proximity sensor 11 may include a touch sensor, such as capacitive sensor, a pressure sensor, or a combination thereof, which may detect physical contact (e.g., by the user 1) with the electronic apparatus 10 (e.g., touching the electronic apparatus 10, holding the electronic apparatus 10, etc.). In some examples, the proximity sensor 11 may include a passive infrared sensor, a capacitive sensor, a gyroscope, an accelerometer, a camera, a microwave sensor, an ultrasonic sensor, a laser based sensor, a photoelectric sensor, a plurality of microphones, a pressure sensor, a magnetic sensor, a thermal sensor, a radar, a combination thereof, which may be used to estimate that the user 1 is in proximity of the apparatus 10 by estimating a distance between the user 1 and the apparatus 10 or by detecting the user 1 in a sensor range from the apparatus 10. For example, the apparatus 10 may be able to detect the user in proximity by detecting a movement of the apparatus 10, for example when the apparatus is picked up by the user 1, using a combination of the gyroscope and the accelerometer which in this instance may function as the proximity sensor 11. In some examples, wireless communication devices, such as WiFi, Bluetooth, LTE, near-field communication (NFC), or radio-frequency identification (RFID) enabled devices, may function as the proximity sensor 11, which may detect a portable device (e.g., tablet, smartphone, smart watch, etc. (not shown)) of the user 1 in proximity by pairing or handshaking with the portable apparatus that may be held or worn by the user 1. The proximity sensor 11 may be coupled to the processor 12. In some examples, the proximity sensor may be coupled to a controller which controls operation of the proximity sensor and/or other sensors of the apparatus (e.g., activating/deactivating sensors, directing sensor data to the processor and/or to storage) and the proximity sensor 11 may thus be operatively coupled to the processor 12 via the controller. The proximity sensor 11 may provide sensor data to the processor 12, for example upon detection of the user 1 in proximity of the apparatus 10, as the user 1 approaches the apparatus 10. The processor 12 may cause the apparatus 10 to enter a first mode responsive to detection of the user 1 in proximity. The first mode may be interchangeably referred to herein as stillness detection mode.

As illustrated, the apparatus 10 may include a motion sensor 13 and one or more additional sensors 14 and output devices 18. Upon entering the first mode, the motion sensor 13, which may be activated responsive to entering the first mode or prior to entering the first mode, begins to monitor movement of the apparatus. The stillness detection mode may include two phases. During a first phase, the apparatus 10 may be configured to process sensor data from the motion sensor to detect initialization movement of the apparatus 10. The initialization movement may be indicative of the user picking up the apparatus 10 (e.g., lifting the apparatus 10 from a surface, such as a table or desk, supporting the apparatus prior to the user coming in proximity).

In some examples, the initialization movement may be detected responsive to detection of an acceleration and/or displacement of the apparatus along a direction normal to the supporting surface, which may be indicative of the apparatus having been picked up by the user. In some embodiments, the initialization movement may be detected responsive to the detection of a touch by the user with a capacitive touch sensor positioned on a supporting side (e.g., the bottom side) of the apparatus, which may be indicative of the apparatus having been picked up and being held in the palm of the user.

The initialization movement may invoke the second phase of the stillness detection mode. During the second phase (i.e., following detection of the initialization movement), the apparatus may be configured to monitor motion of the apparatus in order to detect a stillness or stationary state of the apparatus. In this phase of the stillness detection mode, the processor periodically receives sensor data (e.g., at frame rates of 100 ms or 200 ms) and analyzes the data to identify if the apparatus 10 has achieved a stationary state. For example a stationary state, which may be interchangeably referred to as moment of stillness, may be a detected based on the processor determining, from the motion data, that the apparatus 10 has experience no movement for a predetermined period of time, such as 1 second or multiple consecutive seconds. Some users may naturally have a more steady hand than others and thus this predetermined period of time may be configurable to reflect different user's natural tendencies. For example, for a user with a relatively steadier hand, the predetermined period which triggers a response may be extended for example to 2 or more seconds so as to filter out the natural steadiness of this particular user's hold. For users with a relatively less steady hand, the predetermined period which triggers a response may be reduced to for example to 1.5 seconds or less. The configuration of the predetermined period of stillness may be performed by the user (e.g., during set up of the apparatus) or may be performed by the apparatus (e.g., via machine learning over a training period).

Continuing with the description of the apparatus 10 in FIG. 1, the motion sensor 13 may be coupled to the processor 12 and/or intermediate controller (not shown) operatively connecting the motion sensor 13 to the processor 12. In some examples, the processor 12 may activate the motion sensor 13, responsive to entering the first mode. In other examples, the motion sensor 13 may be active prior to detection of the user in proximity (e.g., prior to entering the first or stillness detection mode), e.g., responsive to powering up the apparatus 10. The motion sensor 13 may provide motion data responsive to movement of the apparatus 1 while the apparatus 10 is in the first mode. For example, the motion sensor 13 may be either a gyroscope, an accelerometer, a camera, a passive infrared detector, a microwave sensor, an ultrasonic sensor, a capacitive sensor, a microphone, a photoelectric sensor, a thermal sensor, a pressure sensor, a magnetic sensor, a heart rate sensor, or a combination thereof. The processor 12 may detect a stationary state of the apparatus 10 based on the motion data. For example, the processor 12 may detect the stationary state, if the processor 12 detects lack of a motion of the apparatus 10 for a predetermined period of time following the detection of the initialization movement. For example, the motion sensor 13 may include a gyroscope that detects and provides orientation information of the apparatus 10, and the processor 12 may detect the stationary state of the apparatus 10 if the orientation information indicates no change in the orientation of the apparatus 10. In some examples, the motion sensor 13 may alternatively or additionally include an accelerometer, which is operable to detect and provide acceleration information. The processor 12 may detect a stationary state of the apparatus 10 in the absence of acceleration of the apparatus as indicated by the acceleration information provided by the accelerometer. Depending on the sensitivity of the motion sensor 13, minute changes in orientation, acceleration or other detected motion which are below a motion threshold (e.g., less than 0.5 degrees of rotational change, or less than 1 mm of translational change) may be ignored for purposes of detecting a stationary state. Other thresholds may be used, for example as may depend upon the natural movement tendencies (e.g., steady vs. shaky hands) of the user.

The processor 12 may cause the apparatus 10 to enter a second mode responsive to the detection of the stationary state of the apparatus 10. Upon entry of the second mode (e.g., upon detection of a stationary state following the initialization movement), the apparatus 10 may provide a response. In some examples, the response may be feedback to the user. In some examples, the response may additionally or alternatively be a communication (e.g., a wireless transmission of a command or data) from/to the apparatus 10 to/from an external apparatus 16. In some examples, in the second mode, the processor 12 may activate additional sensors 14 and/or output devices 18. The additional sensors 14, if applicable, may be used alone or in combination with the motion sensor 13, to monitor the user 1, such as to obtain information associated with the user 1. Information associated with the user 1 may include any voice, image and motion data recorded while the user 1 is holding the apparatus 10. The output devices, which may include one or more feedback devices and/or one or more wired or wireless communication devices, may be configured to provide response. As described herein, the response may be feedback and/or communication with external electronic devices (e.g., external apparatus 16, which may be a computer, a smartphone, a television, a radio or other media device, or a household appliance such as a thermostat, a refrigerator, a cooking appliance, or other). In some examples, the communication with the external apparatus may include a command to the external apparatus 16 to transmit data to the apparatus 10 and the apparatus 10 may provide feedback based on the data received from the external apparatus 16.

A feedback response may include a visual, audible, or tactile response, which may be generated responsive to the detection of the stationary state alone or in conjunction with a communication response. The feedback response may be generally directed toward the user, such as to notify the user of the acknowledged interaction. A visual feedback response may be provided by way of illuminating a light or producing a pattern of light with one or a plurality of light sources of the apparatus. Similarly, an audible response may be provided by way of generating a sound or producing a pattern of sounds with one or a plurality of sound sources of the apparatus. Tactile responses may be provided by way of internally generated movement (e.g., via an actuator such as a vibrator) by the apparatus, which may cause the apparatus to move in a given manner (e.g., vibrate, hop, tilt or rock from side to side, move such as to cause the apparatus to change facing orientation with respect to the user, or motion which may resemble nodding such as tilting the apparatus toward and away from a direction facing the user). Providing feedback responses may be useful, not only during normal course of use of the apparatus 10 so as to provide a sense of communication between the user and the apparatus which may be pleasing to the user, but especially during a training period so as to aid the user in naturally learning the user interface provided by the apparatus 10.

Communication responses may be provided by the apparatus 10, for example in the form of a wireless transmission to an external apparatus 16. A communication response may be configured to elicit a response from the external apparatus 16. For example, the communication (e.g., wireless transmission) may include a command for controlling a function of the external apparatus 16. The external apparatus 16 may perform a function (e.g., turn On or Off, control volume, temperature, or other parameter, begin playback of audio or visual information, store information, retrieve information, etc.) responsive to the communication from the apparatus 10. Different communications may be generated by the apparatus 10 depending on the user's actions in relation to the apparatus 10 during the stillness detection mode, as further described herein. In some examples, the apparatus 10 may be configured to receive information associated with the user during the stillness detection mode and the communication may include or be based, at least in part, on the received information, as further described.

Referring back to the example in FIG. 1, the apparatus 10 may receive information associated with the user 1 from the sensors 14, which information may be processed by the processor 12 for providing a response with the apparatus 10, e.g., with one or more of the output devices 18. As discussed, in some examples, the response provided by the apparatus 10 may be directed to an external apparatus 16 rather than the user, such as by transmitting a command, data, instructions, or other type of communication. The communication response may be provided by communication circuitry of the apparatus 10, e.g., by communication device 15.

As described, the apparatus 10 may include one or more additional sensors 14. For example, one additional sensor 14 may be a camera. The camera may capture a sequence of images of the user 1. Another additional sensor may be a microphone, which may capture sounds from the user. In some examples, the additional sensors may include additional motion sensor(s). In some examples, sensor data obtained by the additional sensors may be supplemented by sensor data from the motion sensor 13, in order to capture a sequence of motion data of the user 1 during the stillness detection mode. The processor may process sensor data obtained during the stillness detection mode, e.g., for providing feedback and/or response(s) as described herein.

The apparatus 10 may further include a memory device 17 configured to store data during the operation of the apparatus 10. For example, the memory device 17 may store the sequence of motion data, images, sounds, or other information associated with the user 1 received by the apparatus 10. In some embodiment, the processor 12 may retrieve previously stored sequences from the memory device 17 for analysis, for example to interpret a gesture of the user 1. The term gesture may be used to refer to any type of natural action of the user, such as actions performed by the user's hand holding the apparatus or action performed by other parts of the user such as the user's face (e.g., facial expressions including winking, smiling, frowning, etc.). The processor 12 may be configured to extract information associated with the user 1 from the gesture of the user 1.

In some examples, the additional sensors 14 may include a microphone. The microphone may be operatively associated with the processor 12 and memory 17 to detect and record sound by or around the user 1. In some examples, the apparatus 10 may be configured to detect utterances of a specific user. For example, the microphone may detect ambient sounds by or around the user 1 and identify the sound associated with the user 1, including the user's voice, or other sound generated by the user (e.g., cough, sneeze, surrounding noise) from the ambient sounds. The apparatus 10 may be configured, e.g., during a set-up or training process, to recognize the sound associated with the user 1. The processor 12 may extract information associated with the user 1 from the sound associated with the user 1. In some examples, the apparatus 10 may recognize speech and may extract utterances irrespective of the user producing the utterances.

As described, the processor 12 may provide a response in the second mode and in some cases, the response may be provided automatically by the apparatus 10 responsive to entering the second mode. The term automatically, as used herein, is generally meant to imply that an action or response performed by the apparatus 10 occurs automatically responsive to a trigger without requiring further action or input by the user. In some examples, the response may include a response to the user. In some examples, the response may involve a communication with an external apparatus. For example, with respect to the former, the apparatus 10 may include an output device 18, such as one or more light emitting diodes (LEDs), a speaker, one or more vibrators, etc. The response may be a visual response (e.g., illuminating a light or a pattern of lights with one or more light emitting diodes (LEDs)), an auditory response (e.g., generating a sound or a pattern of sounds with the one or more speakers), or a tactile response (e.g., causing the apparatus to vibrate, rock, or generating another type of motion with the one or more vibrators).

The apparatus 10 may include a wired or a wireless communication device 15 that transmits a command or data to an external apparatus 16 (e.g., another computing device, an electronic appliance such as a TV, radio, another media device or a household appliance). In some examples, the command may include a command to perform a function of the external apparatus 16 (e.g., turn the appliance on or off, volume control, begin playback of audio or video, temperature control of thermostat or a cooking appliance, etc.). The command or data transmitted to the external apparatus 16 may be based on the mode of apparatus 10. In some examples, the command or data may be transmitted responsive to the apparatus 10 entering a particular mode, such as responsive to entering the second mode. For example, the apparatus 10 may be configured to transmit a command to a media device to turn the media device ON responsive to the apparatus entering the second mode. In some examples, the command or data transmitted to the external apparatus 10 may be based on the information associated with the user 1. In some examples, the data may include information (e.g., a tag or other metadata) to be associated with data in the external apparatus 16. In some examples, the data transmitted to the external apparatus 16 may be a recording associated with the user (e.g., audio, a still image or video, and/or context associated with the recording), which may be transmitted to the external apparatus 16 for storage and/or further processing by the external apparatus 16. In some examples, the apparatus 10 may transmit both data and a command (e.g., a recording and a command to playback the recording) upon entering a given mode. In some examples, the apparatus 10 may continue to monitor the state of the apparatus (e.g., via motion data) following the providing of the response in order to extract additional information and/or provide additional responses, for example during a second stillness detection mode.

In some examples, responsive to the command and/or data from the apparatus 10, the external apparatus 16 may perform the command (e.g., retrieve user data from storage) and/or may provide a return communication to the apparatus 10 based on the user data. The apparatus 10 may receive the return communication from the external apparatus 16. Responsive to the return communication, and in some cases jointly with the information associated with the user and/or a current state of the apparatus 10, the apparatus 10 may provide feedback to the user 1. The process of interfacing with the user 1 may continue until the apparatus 10 is replaced onto its supporting surface (e.g., table or desk), which may be detected for example by no longer detecting contact with a bottom sensor of the apparatus 10, which may return the apparatus to the first phase of the stillness detection mode or the standby mode, of the apparatus no longer detects the user in proximity.

Figure 2B:
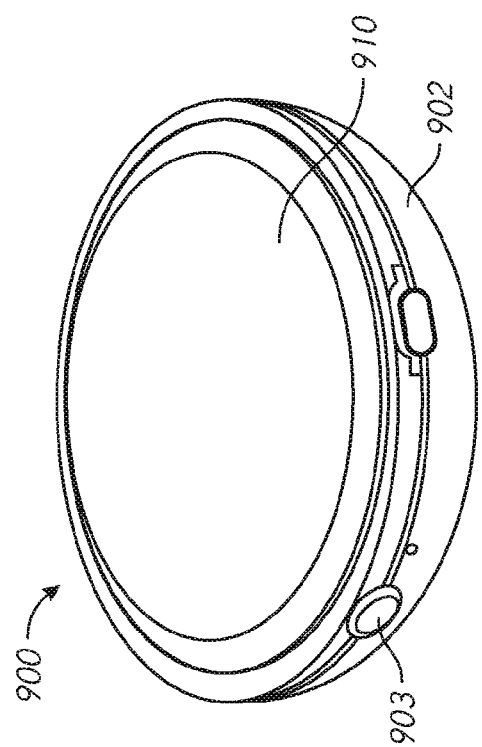
Figure 2A:
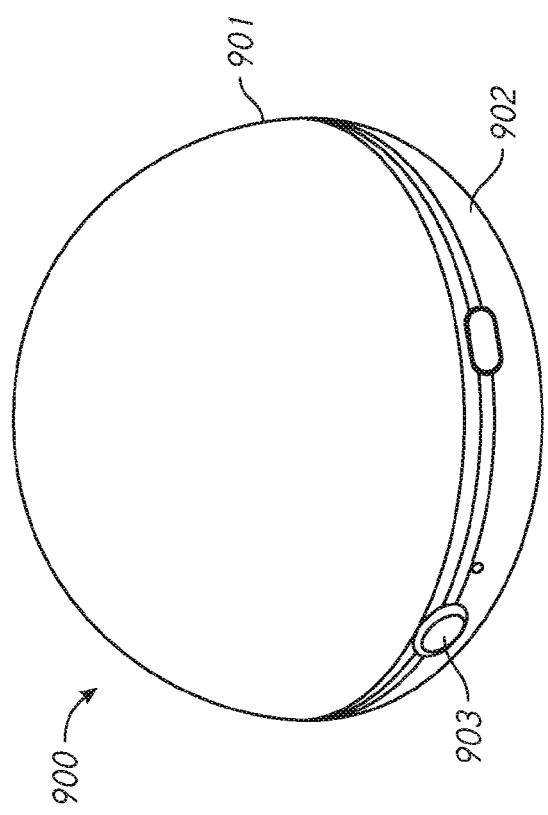
FIG. 2A is a perspective view of an apparatus in according with an embodiment of the present disclosure.

FIG. 2A is a perspective view of an apparatus 900 in accordance with an embodiment of the present disclosure. An apparatus 900 may be used to implement the apparatus 10 of FIG. 1. The apparatus 900 may include elements that have been previously described with respect to the apparatus 10 of FIG. 1. For example, the apparatus 900 may be a handheld apparatus having a relatively spherical shape. The apparatus 900 may be sized to fit in the palm of the user 1, which may enables the user 1 to perform various gestures effortlessly while holding the apparatus. By detecting and responding to moments of stillness of the user while holding the apparatus 900, and thus moments of stillness of the apparatus itself, the apparatus 900 may be configured to provide an effortless and unconscious interface between the user and any electronic device within the users living or working space. For example, the apparatus 900 may be aesthetically, ergonomically, or otherwise pleasingly shaped, which may not only enhance the user's living or working environment but may encourage the user to pick up and/or hold the apparatus 900. Holding the apparatus 900, aside from any computer/user interface enabled thereby, may be pleasing and/or calming to the user. The natural interaction of the user with the apparatus 900 may thus enable a more intuitive and user friendly interface, e.g., without requiring significant or any effort, attention, or intention from the user to solicit responses from the apparatus 900 itself and/or other apparatuses in the user's environment. In some examples, the shape and/or the external appearance of the apparatus may provide an ornamental/aesthetic function.

The apparatus 900 may include an upper portion 901 and a lower portion 902 that may form an enclosure of the apparatus 900. In some examples, the enclosure may be made from a plastic material (e.g., plastic materials suitable for injection molding as is typically known in the consumer electronic industry). In some examples, a portion of the enclosure, such as the upper portion, may be translucent. In some examples, the enclosure or a portion thereof, may be made from acrylic. In further examples, the enclosure, or a portion thereof, may be formed of a natural material, such as wood, bamboo, quartz, marble, fabric made from synthetic or natural fibers, leather, or a combination thereof, which may provide distinctive color, texture, and tactile sensation and natural comfort that may reduce user's consciousness and stress when interfacing with the apparatus 900. For example, the upper portion 901 and the lower portion 902 may be either substantially hemispherical or hemi-ellipsoidal in shape. The apparatus 900 may maintain a static position when rested on a relatively flat surface that enables the apparatus to be in a stationary state with ease. The apparatus 900 may include a camera 903. As previously described, the camera 903 may be used for proximity sensing, motion sensing, and gesture detection. The camera 903 may be able to detect free expressions of the user 1 from facial gesture, hand movement, or body movement. The camera 903 may provide images to the processor 12.

FIG. 2B is a perspective view of the apparatus 900 in according with an embodiment of the present disclosure. Relative to FIG. 2A, the upper portion 901 of the apparatus 900 is not shown. As illustrated, the apparatus 900 may include a light adjusting device 910. The light adjusting device 910 may adjust light provided by one or more components located within the lower portion 902, thus the light provided by the apparatus 900 may be split, scattered and/or "softened," thereby reducing recognition of individual light sources of the apparatus 900.

FIG. 2C is a perspective view of an apparatus in according with an embodiment of the present disclosure. Relative to FIG. 2B, the light adjusting device 910 of the apparatus 900 is not shown. As illustrated, the apparatus 900 may include a plurality of proximity sensors 906, which may be used to implement the proximity sensor 11 of FIG. 1. Each of the proximity sensors 906 may determine the proximity of the user 1 to the apparatus 900 and may be any infrared sensor known in the art, (e.g. cameras, a microwave sensor, an ultrasonic sensor, a laser based sensor, a magnetic sensor, an optical sensor, passive infrared sensors, a thermal sensor, a radar, microphones). As illustrated, in some examples, proximity sensors 906 may be disposed around a circumference of the apparatus 900. In other examples, the proximity sensors 906 may be located in other locations of the apparatus 900. The apparatus 900 may include an interface board 915. The interface board 915 may include a plurality of light emitting devices, such as light emitting diodes (LEDs) 920. Each of the LEDs 920 may provide light through the light adjusting device 910 and the upper portion 901 to provide light patterns of visual responses to the user 1. While shown as being arranged in a particular pattern (e.g., a spiral), the LEDs 920 may be arranged within the interface board 915 in any desired pattern, such as a grid. The interface board 915 will be explained in further detail herein (see FIG. 10).

FIG. 2D is a perspective view of an apparatus in according with an embodiment of the present disclosure. Relative to FIG. 2C, the interface board 915 is not shown. As illustrated, the apparatus 900 may include a battery 930 and a touch sensor 932. The battery 930 may be any battery, including for example, rechargeable batteries, known in the art and may store and provide power to various components of the apparatus 900. The battery may be detachable charged outside the apparatus 900 or installed integrated with an internal charger for wired/wirelessly charging within the apparatus 900. The touch sensor 932 may include a touch sensor belt disposed circumferentially about the apparatus 900 and may detect a contact of the user when the user 1 touches any portion of a surface of the apparatus 900 where the touch sensor 932 is disposed. The touch sensor 932 may be capacitive, resistive, piezoelectric, or a combination thereof.

FIG. 2E is an exploded perspective view of an apparatus in according with an embodiment of the present disclosure. Relative to FIG. 2D, the battery 930 is not shown. As illustrated, the touch sensor 932 may include a touch pad 908. The touch pad 908 may include a plurality of radial electrode lines radially extending from the center of the touch pad 908 and may determine whether the apparatus 900 is supported by a surface, such as a table or a palm of the user 1. In some examples, the proximity sensors 906 may be periodically disposed along the touch sensor belt of the touch sensor 932.

Figure 3:
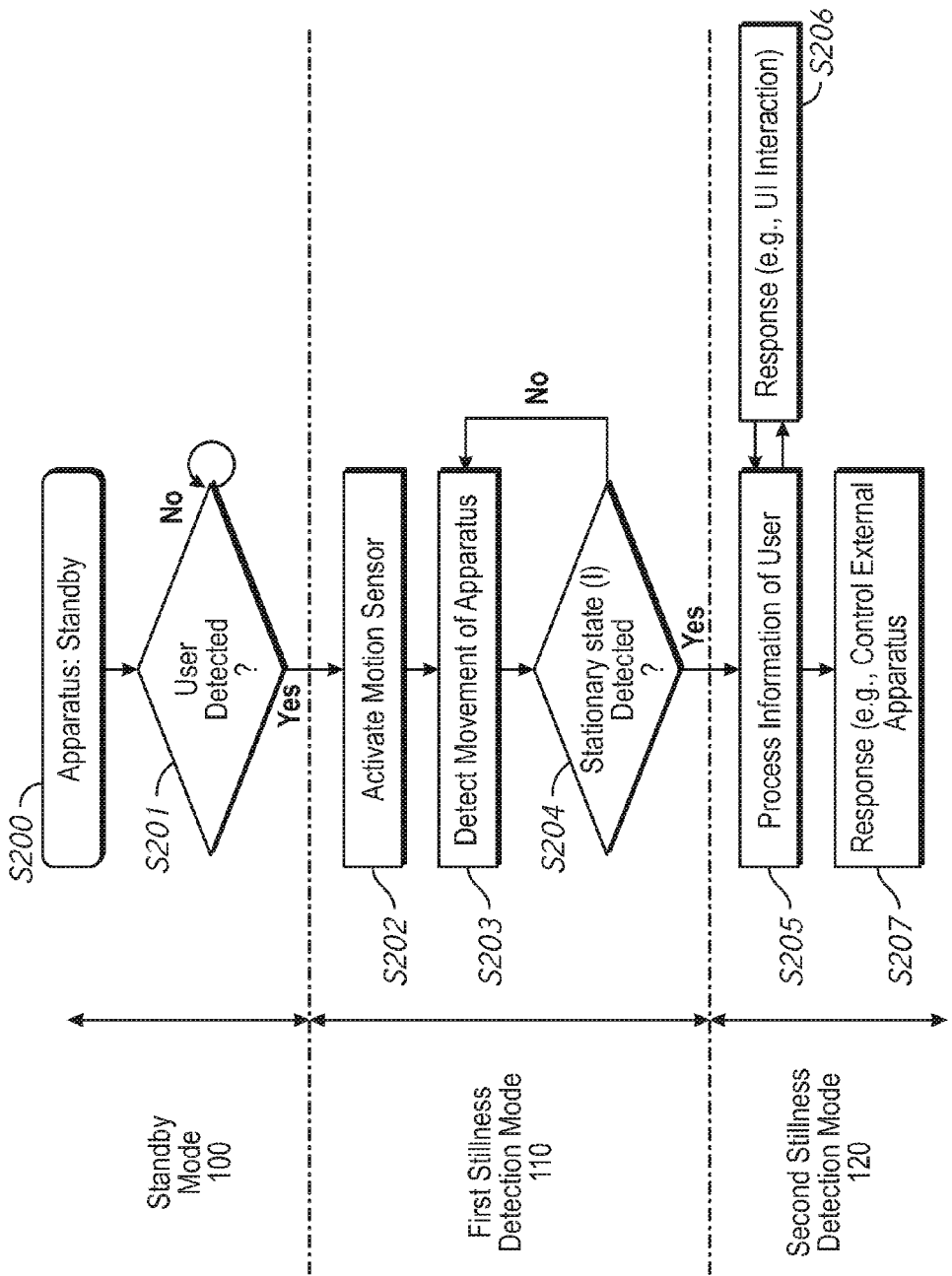
FIG. 3 is a flow diagram of a method of interfacing with a user including detecting a stationary state of an apparatus, in accordance with an embodiment of the present disclosure.

The apparatus (e.g., apparatus 10) may interface with the user 1 and/or with external apparatuses (e.g., other computing or electronic devices in the user's environment), by detecting a stationary state and in some examples, by also detecting information associated with the user 1. FIG. 3 is a flow diagram of a method of interfacing with a user including detecting a stationary state of an apparatus (e.g., apparatus 10), in accordance with an embodiment of the present disclosure.

Initially, the apparatus 10 may be powered on (e.g., via a battery) and be in a standby mode (S200). While the apparatus 10 is in a standby mode 100, the proximity sensor 11 may be active so as to detect the user 1 when the user comes in proximity (S201) to the apparatus 10. The proximity sensor 11 continues to sense for an object (e.g., the user) in proximity until the so detected. Depending on the proximity sensor(s) employed, the user's approach or proximity to the apparatus 10 may be detected based on, for example, visual information such as images including one or more objects within the field of view of the sensor (e.g., an image capture device), auditory information such as change of an environmental noise level, optical, thermal or electromagnetic information caused by the presence of the user 1 within a predetermined range of the apparatus 10, or tactile information caused by the user's contact (e.g., touch) by the apparatus 10. In some examples, the user may be detected to be in proximity responsive to a detected touch on a touch sensor of the apparatus 10. In some examples, the user may be detected to be in proximity without requiring physical touch between the user and apparatus, such as responsive to detecting with for example an optical, thermal, or electromagnetic sensor, the user within a sensing range of the sensor. The apparatus 10 may enter a stillness detection mode 110 responsive to detection of the user 1 in proximity (S201). During the stillness detection mode, the apparatus is configured to monitor movement of the apparatus for first detecting an initialization motion and then detecting a stillness or stationary state whereby a response may be provided responsive to the detection of the stationary state. As described, the apparatus, during a first phase of the stillness detection mode, may monitor movement of the apparatus to detect the initialization movement which may indicate that the apparatus 10 has been picked up and/or placed on the user's palm. Upon detecting of the initialization movement, the apparatus 10 may continue to monitor its movement during the stillness detection mode 110 for detecting a stationary state.

In the stillness detection mode, the processor 12 may activate the motion sensor 13 if not already active, and the motion sensor 13 may periodically (e.g., every 1 second, 1 millisecond, etc). provide motion data to the processor (S202). The processor may process the motion data frames to identify a stationary state of the apparatus 10. For example, the motion data may be visual information, auditory information, velocity/acceleration information, orientation information, positional information, etc., that may change due to displacement (e.g., changes in a location) or tilts (e.g., changes in an orientation) of the apparatus 10. The processor 12 may periodically receive the motion data from the motion sensor 13. (S203) The processor 12 may detect a stationary state I of the apparatus 10 based on the motion data (S204) during the stillness detection mode. For example, the processor 12 may analyze the motion frames during the stillness detection mode and detect the stationary state of the apparatus 10 by detecting lack of a motion of the apparatus for a predetermined period. The predetermined period may be a fixed period of time, flexibly programmable for each user, or depending on contexts of the user 1.

The apparatus 10 may enter a second stillness detection mode 120, responsive to detection of the stationary state of the apparatus 10. In the second stillness detection mode 120, the apparatus 10 may be configured to generate further responses. In some examples, the apparatus may record information associated with the user (e.g., audio, still image(s) or video data, motion data while the apparatus 10 is being held by the user, etc.) which may be used when providing a response during the second stillness detection mode 120. For example, the processor 12 may process information associated with the user 1 (S205) received from the sensors 14 in the second stillness detection mode to determine and provide further response(s) (e.g., S206, S207). Depending on the information recorded, the apparatus 10 may provide a feedback response via a feedback output devices 18 (S206) or via a communication output device 15. The apparatus 10 may continue to monitor interaction between the user and apparatus 10 and generate visual, auditory, or tactile responses to the user 1 communication response to external appliance(s), which responses may include any one or more of the responses described with reference to the first stillness detection mode 110.

A response by the apparatus 10 during the second stillness detection mode may be based, at least in part, on a detected pattern, for example a pattern of stationary states of the apparatus 10 (or moments of stillness) during the second stillness detection mode. In some examples, the response may be based, at least in part, on a detected motion or pattern of movements of the apparatus. In some examples, the response may be based, at least in part, on recorded information associated with the user (e.g., audiovisual recording of the user).

Figure 4A:
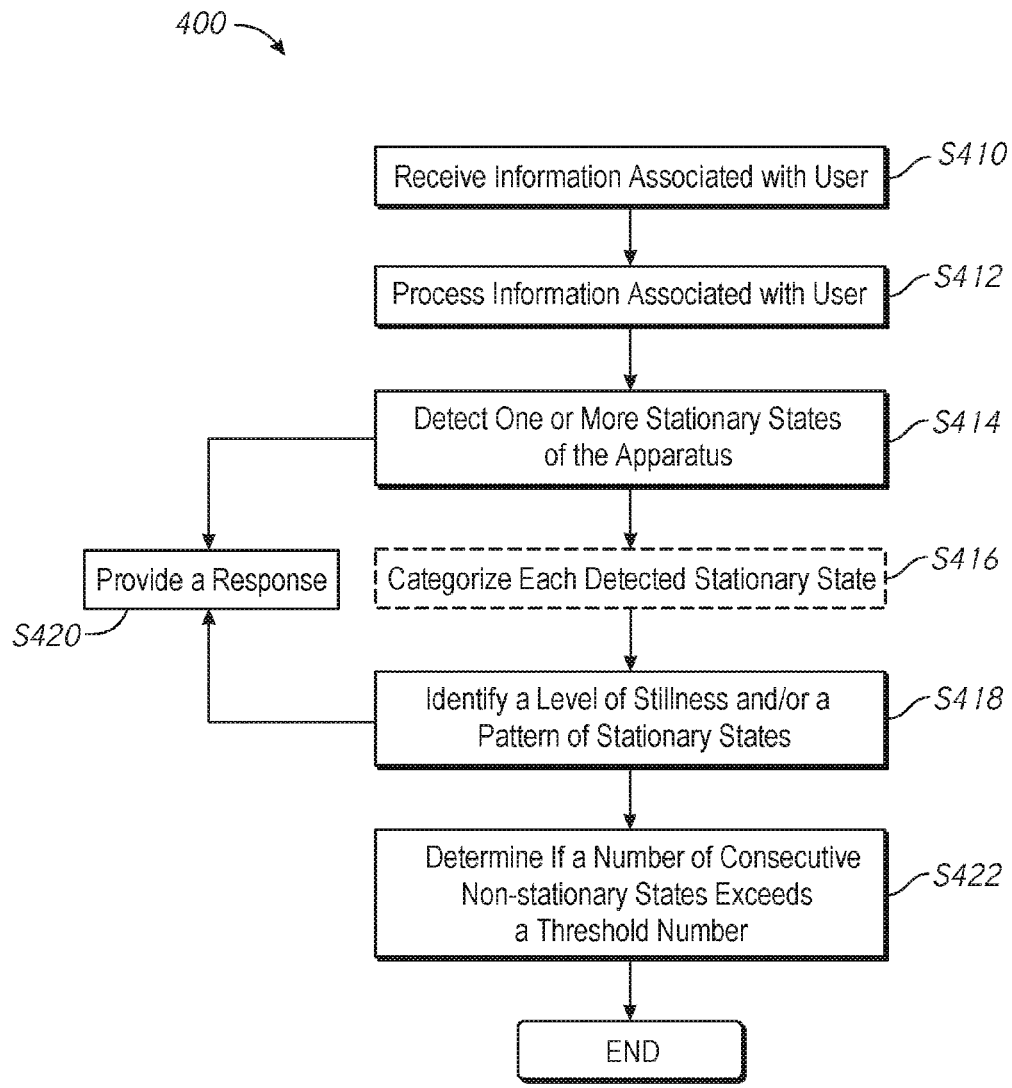
FIG. 4A is a flow diagram of processing of information associated with a user by the apparatus, in accordance with an embodiment of the present disclosure.

FIG. 4A is a flow diagram of a process in accordance with an embodiment of the present disclosure. The process 400 in FIG. 4A may be used to process information associated with a user for example to detect one or more stationary states of the apparatus 10. The process may begin with the apparatus 10 receiving information associated with a user (as shown in block S410).

Upon receiving information associated with a user, in this case motion data, the apparatus 10 may process the information of the user 1 (as shown in block S412) to detect a stationary states (as shown in block S414). The processor 12 may detect one or more periods of the stationary state of the apparatus 10 based on the motion data. In some examples, the apparatus may identify a level of stillness (e.g., as described further with reference to FIG. 4B) and/or a pattern of the stationary states, as shown in block S418. In some examples, different degrees of stillness may correspond to different stationary states and the processor may categorize the detected one or more stationary states in accordance with the degree of stillness (e.g., a calm state, a still state, etc.), as shown in optional block S416. In some examples, the determination of stationary state may be binary, e.g., the apparatus is either in a stationary state if a condition is met (e.g., lack of motion as defined by a motion thresholds to filter out noise) or the apparatus is in a non-stationary state if the condition is not satisfied. The process may be configured to end upon detection of a large number of non-stationary states in a sequence, and in some examples, responsive to detection of a greater number of consecutive non-stationary states than a predetermined threshold (e.g., 2, 3, 4 or more consecutive non-stationary states), as shown in block S422, which may cause the apparatus to exit the second stillness detection and return to the first stillness detection mode, and in some examples to phase two of the first stillness detection mode whereby the apparatus 10 may monitor motion data to identify a subsequent stationary state (e.g., to enter the second stillness detection mode) or a particular motion state (e.g., for performing further functions as described herein).

The processor 12 may record a sequence of states of the apparatus 10 including one or more stationary states or non-stationary states occurring in the second stillness detection mode to detect a pattern of the stationary state in the second stillness detection mode. The apparatus 10 may be configured to provide a response upon detection of one or more stationary states, and in some cases a particular response may be provided responsive to detection of a particular level of stillness or pattern of stationary states, as shown in block S420. Based on the detected level of stillness or pattern of the stationary states, the apparatus 10 may be configured to extract further information associated with the user 1 (e.g., begin recording audio and or images/video), transmit a command to control the external apparatus, and/or provide feedback (e.g., blinking, playing sound, or vibration) to the user 1. In some examples, the apparatus 10 may store a plurality of sequences of states (e.g., in the memory device 17) and determine a pattern of the stationary states by comparing a currently recorded sequence of states of the apparatus 10 with the plurality of stored sequences. In some examples, the stored sequences may be preprogrammed in the apparatus 10, e.g., stored in a pre-existing database of sequences generated by the user, and the pattern may be determined based on the sequences in the database of sequences generated by the user. For example, the apparatus 10 may use a pre-existing database of sequences obtained from different users, and the pattern may be determined based on sequences in the pre-existing database of sequences. In some examples, the stored sequences may be stored in a database of sequences obtained only from user 1 and/or the apparatus 10 may be configured to add sequences to the database for enhancing and tailoring the pattern recognition to a particular user.

Figures 4B, 4C:
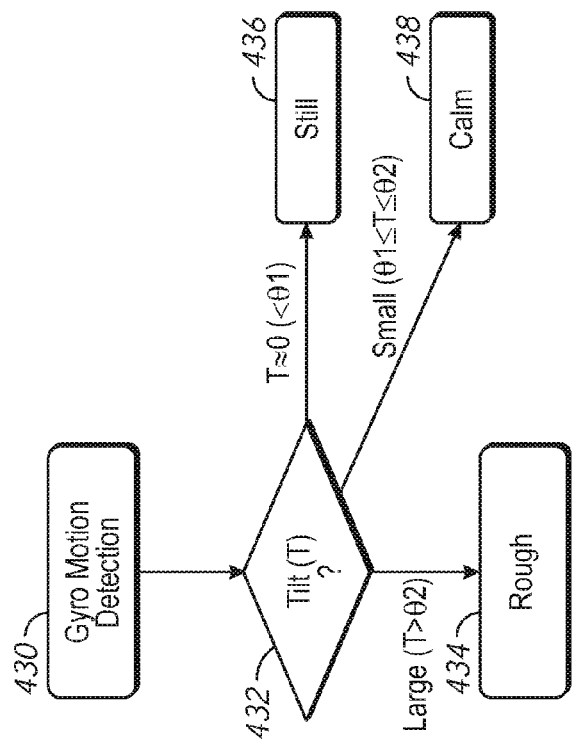
FIG. 4B is a table diagram of stillness level detection based on the detection of the motion of the apparatus, in accordance with an embodiment of the present disclosure
FIG. 4C is a flow diagram of detection of a motion of the apparatus by a gyroscope, in accordance with an embodiment of the present disclosure.

In some examples, the pattern detection may include detecting a level of stillness (e.g., as shown in block S418 of FIG. 4A). FIG. 4B is a table diagram of stillness level detection based on the detection of the motion of the apparatus, in accordance with an embodiment of the present disclosure. For example, the apparatus 10 may record a sequence of the states of the apparatus 10. In the illustrated example, ten cycles are shown but a different number of cycles may be analyzed for determining a pattern in accordance with other examples. The states may include a "rough" state where the apparatus 10 is in a dynamic state, a first stationary state (e.g., a "calm" state) or a second stationary state (e.g., a "still" state) which corresponds to a greater degree of stillness than the first stationary state. The illustrated Sequences I and II start with the apparatus 10 in the "rough" state. In Sequence I, a "still" state of the apparatus is recorded at the third, fourth, seventh, ninth and tenth cycles, and a "calm" state of the apparatus is recorded at the second, fifth, sixth and eighth cycles. In Sequence II, a "calm" state is recorded from the second cycle to the tenth cycle. Because of Sequence I has a greater number of occurrences of the "still" state than Sequence II, the processor 10 may determine that Sequence I has a higher level of stillness compared to the level of stillness of Sequence II.

The states of the apparatus 10, such as the "rough" state, the "calm" state, or the "still" state may be determined based on detected motion data, such as displacement or tilts. For example, a gyroscope may be used as the motion sensor 13. FIG. 4C is a flow diagram of detection of a motion of the apparatus by a gyroscope, in accordance with an embodiment of the present disclosure. Once the processor 12 may determine tilt information (T) based on motion data from the gyroscope (S430). For example, the gyroscope may be a three-axis gyroscope that provides the motion data that may include three-axis data, including two data indicating tilts from two orthogonal axes on a horizontal plane and another data indicating a tilt from a vertical axis perpendicular to the horizontal plane. In other examples, accelerometers (e.g., arranged along three axes corresponding to the horizontal and vertical axes) may be used to obtain the tilt information or degree of stillness may be based on amount of acceleration rather than amount of tilt. Based on the motion data, the processor 12 may obtain the tilt information (T) and evaluate the tilt information (S432). If the tilt information (T) is nearly equal zero (e.g., smaller than a first threshold angle (for example, T<θ1)), the processor 12 may determine that the apparatus 10 is in the "still" state (S436). If the tilt information (T) is relatively small (e.g., between the first threshold angle and a second threshold angle (e.g., θ1≤T≤θ2)), the processor 12 may determine that the apparatus 10 is in the "calm" state (S438). If the tilt information (T) is relatively large (e.g., greater than the second threshold angle (for example, T>θ2)), the processor 12 may determine that the apparatus 10 is in the "rough" state (S434).

As described, the apparatus 10 may be configured to provide a response (e.g., as shown in block S420 in FIG. 4A) based information associated with a user and received by the apparatus 10. In some examples, different levels of stillness of different recorded sequences may elicit different responses by the apparatus. For example, a first level of stillness may be associated with a first response (e.g., transmit a command to an external apparatus), while a second level of stillness may be associated with another response (e.g., provide feedback to the user and/or begin recording audiovisual data of the user). In some examples, different patterns of stationary states may elicit a different response by the apparatus. For example, referring back to the table in FIG. 4B, the apparatus 10 may be configured to not only identify a level of stillness but identify sequential arrangements of different stationary states (e.g., at least two sequential "still" states in a sequence may elicit a particular response such as begin recording audiovisual data, or at least three sequential "still" states in a sequence may elicit a response of transmit an ON command to an external media apparatus). In some examples, the apparatus may be configured to transition to yet another mode of operation (e.g., a third mode, which may be referred to as motion pattern sensing mode) responsive to a particular pattern of stationary states. In some examples, the apparatus may be configured to enter the third mode responsive to the termination of process 400 (e.g., as shown in block S422).

Figure 5:
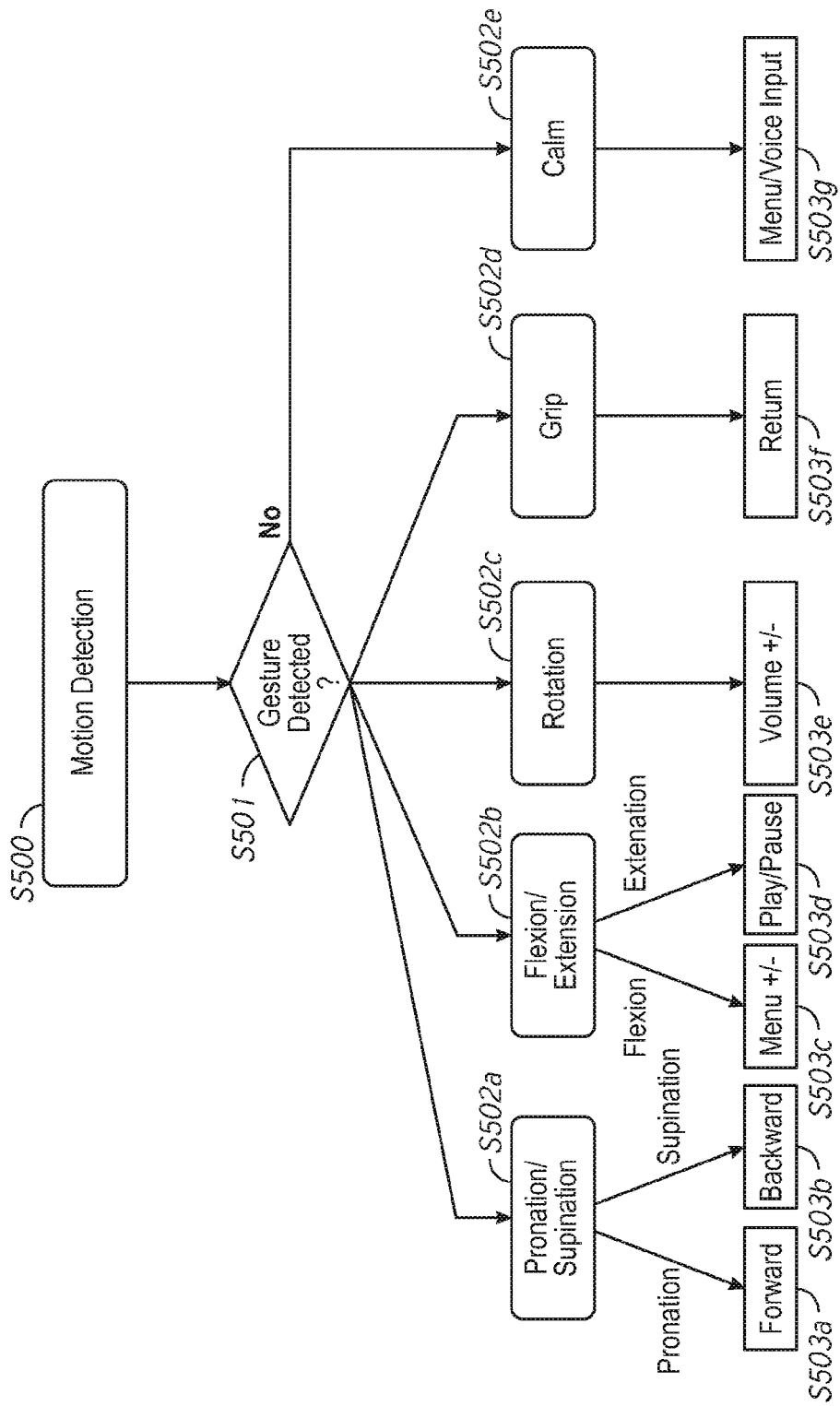
FIG. 5 is a flow diagram of detection of a command for an external apparatus based on gesture of a user, in accordance with an embodiment of the present disclosure.

For example, the apparatus may be configured to perform pattern detection in a third mode, which may include detection of user gestures. The apparatus may be configured to provide a response based on the detected user gesture. FIG. 5 is a flow diagram of motion detection process, which may be used to generate a command for an external apparatus based on a gesture of a user, in accordance with an embodiment of the present disclosure. As shown in block S500, the motion detection process may begin with the processor 12 receiving a sequence of motion data of the user 1. In some examples, recorded sequences of motion data may be stored in the memory device 17 for subsequent use in interpreting subsequent recorded sequences of motion data. The processor 12 may retrieve one or more stored sequences of motion data of the user 1 to interpret a gesture. The stored sequences may be categorized into a plurality of categories. For example, the categories may include pronation, supination, flexion, extension, or rotation, or a change in the manner of contact (e.g., change from simply supporting or holding the apparatus to holding the apparatus more tightly such as to "grip" of the apparatus 10). The change in the manner of contact may be detected by one or more touch sensors or a pressure sensors positioned at various perimeter portions of the apparatus for example to detect contact with perimeter sides of the apparatus in addition to the contact with the bottom side. Lack of movement may be categorized in the third mode as a "calm" gesture, as previously described. The apparatus 10 may be configured to provide different responses responsive to different detected gestures. For example, the apparatus may be configured to provide a "forward" command (S503a) or a "backward" command (S503b) to the external apparatus 16 responsive to detection of a pronation gesture and a supination gesture (S502a), respectively. The apparatus 10 may be configured to provide a "menu +/−" command (S503c) or a "play/pause" command (S503d) to the external apparatus 16 responsive to detection of a flexion gesture or an extension gesture (S502b), respectively. The apparatus 10 may be configure to provide a "volume +/−" command (S503e), a "return" command (S503f), and a "menu/voice input" command (S503g) to the external apparatus 16 responsive to a rotation gesture (S502c), a grip gesture (S502d), and a calm gesture (S502e), respectively. In this manner, various gestures of the user 1 may be interpreted and information associated with the user may be extracted for example for use in controlling an external apparatus, such as a media apparatus or a household appliance. Based on the extracted information, a command or other information associated with the user 1 may be generated and transmitted to the external apparatus 17. Categories of gestures and commands associated with the gesture categories are merely an example, and the categorization and association are not limited to the above description. For example, the gestures, as well as patterns of stillness pattern, may be used to identify the external apparatus 17 of a plurality of external apparatuses. For example, a plurality of gestures may be associated with the plurality of external apparatuses, or a gesture directing the apparatus 10 to have a certain orientation towards the external apparatus 17 may be interpreted as an identifier of the external apparatus 17.

Figure 6:
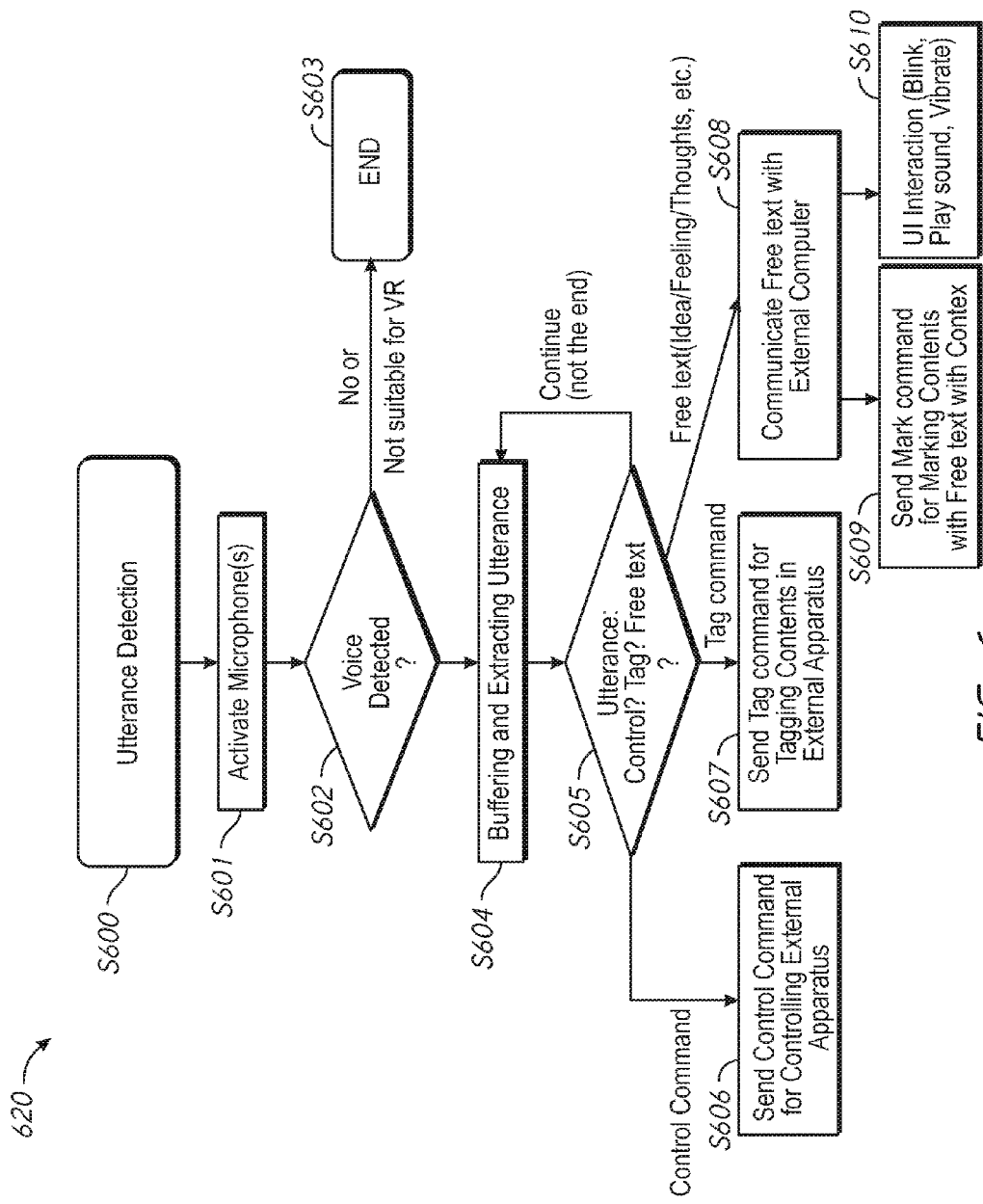
FIG. 6 is a flow diagram of detection and extraction of an utterance of a user, in accordance with an embodiment of the present disclosure.

In accordance with further examples, utterances of the user may be extracted, tagged and stored from information associated with the user 1 obtained by the apparatus 10. FIG. 6 is a flow diagram of detection and extraction of an utterance of a user, in accordance with an embodiment of the present disclosure. For example, the processor 12 may initiate detection of the utterance of the user 1 (S600), upon detecting an intent of the user 1 to speak in previously extracted information associated with the user 1. The intent of the user to speak may be detected responsive to detection of a stationary state and/or a particular sequence of stationary states (e.g., two consecutive "still" states, or a sequence of 3, 4, 5, or more "calm" states). The processor 12 may activate microphone(s) (S601), if not previously activated, as additional sensors 14. The microphone 12 may detect sounds from the user 1 and transmit audio data corresponding to the sounds to the processor 10. The processor 12 may determine whether a voice of the user 1 may be detected for a predetermined period of time (S602). If the processor 12 does not detect sounds related to the voice of the user 1 or the processor 12 detects environmental noise around the apparatus 10 is too loud for voice recognition in the predetermined period of time, the process 620 of detecting utterance(s) of the user may be halted (as shown in block S603). In some examples, upon termination of the process 620, the apparatus 10 may transition to a different mode. If the processor 12 detects the voice of the user 1, the processor 12 may record the audio data in the audio signal on the memory device 17. The processor 12 may buffer the recorded audio data and extract an utterance of the user from the audio data (S604). If the utterance is intelligible and interpretable as a control command, a tag command, or free text (e.g., idea, feeling, thoughts, etc.) (S605), the processor may generate a response based on the utterance. For example, if the utterance is interpretable as a control command (e.g., "turn TV On"), the apparatus 10 may transmit a corresponding control command for controlling the external apparatus 16 using the wired/wireless communication device 15 to the external apparatus 16 (S606). In other examples, the utterance may be correlated to other commands (e.g. "forward," "backward," "menu up/down," "play/pause," "volume up/down," "return," "menu/voice input," etc.) and corresponding control command may be transmitted to an external apparatus. The control command may be indicative of an instruction to search content associated with the user that is stored on the external apparatus 17. For example, if the utterance is interpretable as a tag command for tagging contents in the external apparatus 16, the apparatus 10 may transmit the tag command using the wired/wireless communication device 15 to the external apparatus 16 (S607). For example, the content may be a currently played content, or a currently broadcasted and recorded as a background task but not being currently played.

If the utterance is interpretable as free text (e.g., idea, feeling, thoughts, etc.), the apparatus 10 may transmit the free text to an external computer (not shown) using the wired/wireless communication device 15 (S608), for example for storage. The apparatus 10 may include one or more wired/wireless communication devices 15, any one of which may be specifically configured for communicating with any number of external apparatuses (e.g., the external computer or household appliance). For example, the apparatus 10 may include a Wi-Fi enabled communication device for communicating information including audiovisual data of the user to an external computer. The apparatus 10 may additionally or alternatively include communication devices configured according to other communication protocols (e.g., Bluetooth, ZigBee, in some cases, IR communication device for transmittal of control commands) for communicating with any number of external apparatuses. In the case of Bluetooth, for example, different pairing codes may be used for communicatively coupling the apparatus 10 to a plurality of external apparatuses.

In some examples, the external computer may store archives of information associated with the user 1 (e.g., context, past entries, user preference, user attributes, user background information, etc.) and provide information associated with the free text to the apparatus 10. For example, the information may be related to one or more content items from the content stored on the external apparatus 16. For example, the information may be an identifier associated with a key word or a key phrase and the processor 12 may count and store a number of occurrences of the extracted key word or a key phrase in the audio data by using the identifier. Based on the number of occurrences of the key word or the key phrase, the processor 12 may provide (e.g., calculate, assign) a weight for the extracted information associated with the user 1, and generate an instruction based, at least in part, on the weight. For example, the instruction may be a mark command of the external apparatus 16 and the apparatus may send the mark command for marking contents with the free text with context (S609), such as the weight. For example, the instruction may be for the apparatus 10 to execute direct user interface interaction with the user 1, and the apparatus 10 may provide feedback (e.g., blinking, playing sound, or vibration) directly to the user 1 (S610).

Figure 7:
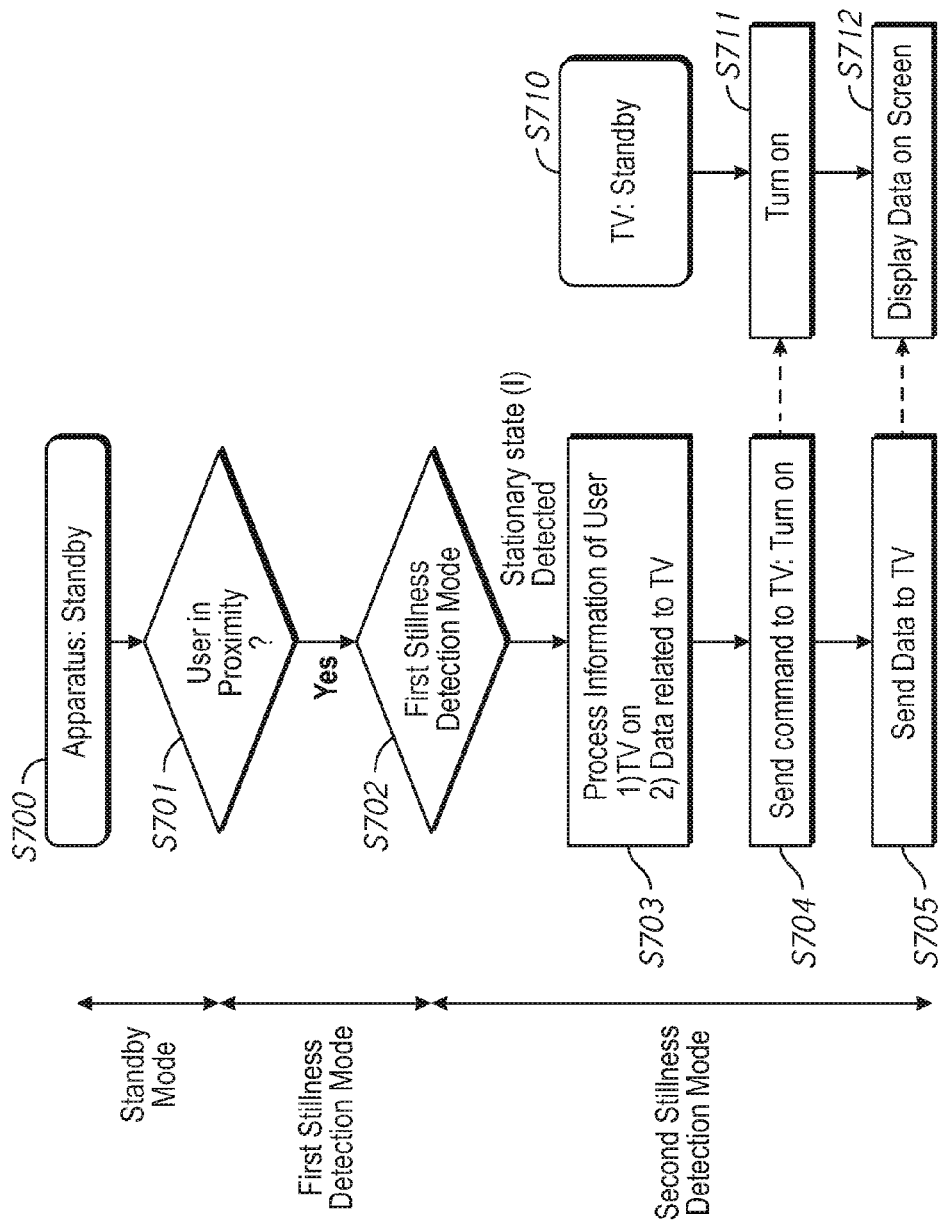
FIG. 7 is a flow diagram of a method of interfacing with a user including processing information associated with the user in a stationary state of an apparatus, in accordance with an embodiment of the present disclosure.

Detection of stationary states of the apparatus 10 and extraction of information associated with the user 1 may be used in a variety of user interactions. FIG. 7 is a flow diagram of a method of interfacing with the user 1 including processing information associated with the user 1 in a stationary state of the apparatus 10, in accordance with an embodiment of the present disclosure. The apparatus 10 may be powered on to be in a standby state (S700). The proximity sensor 11 may detect the user 1 in proximity (S701) while the apparatus 10 is in a standby mode 100. The apparatus 10 may enter a first stillness detection mode, upon detection of the user 1 in proximity (S701), and the processor 12 may activate the motion sensor 13 to periodically provide motion data to the processor (S702). Following a triggering motion, also referred to herein as initialization movement (e.g., upon detection that he apparatus is being held by the user), the processor 12 may detect a stationary state I of the apparatus 10 based on the motion data in the first stillness detection mode, and the apparatus 10 may enter a second stillness detection mode (S703) responsive to detection of the stationary state of the apparatus 10. The processor 12 may process information associated with the user 1 (S703) received from the sensors/output devices 14 in the second stillness detection mode. For example, a result of processing the information associated with the user 1 may prompt the apparatus 10 to provide a command to control the external apparatus 16 that is a television (TV) to turn on, and the apparatus 10 may transmit a command "Turn on" to the television via the wired/wireless communication device 15 (S704). The television in a standby state (S710) may receive the command "Turn on" from the apparatus 10, and may transition from the standby state to active state, responsive to the command "Turn on" (S711). Further, continuous processing of the information associated with the user 1 may prompt the apparatus 10 to provide data related to the television extracted from the information associated with the user 1 to the television. The apparatus 10 may transmit the data "Turn on" to the television via the wired/wireless communication device 15 (S705). The television may continuously receive the data from the apparatus 10, and may display the data on a screen, responsive to the received data (S712).

Figure 8:
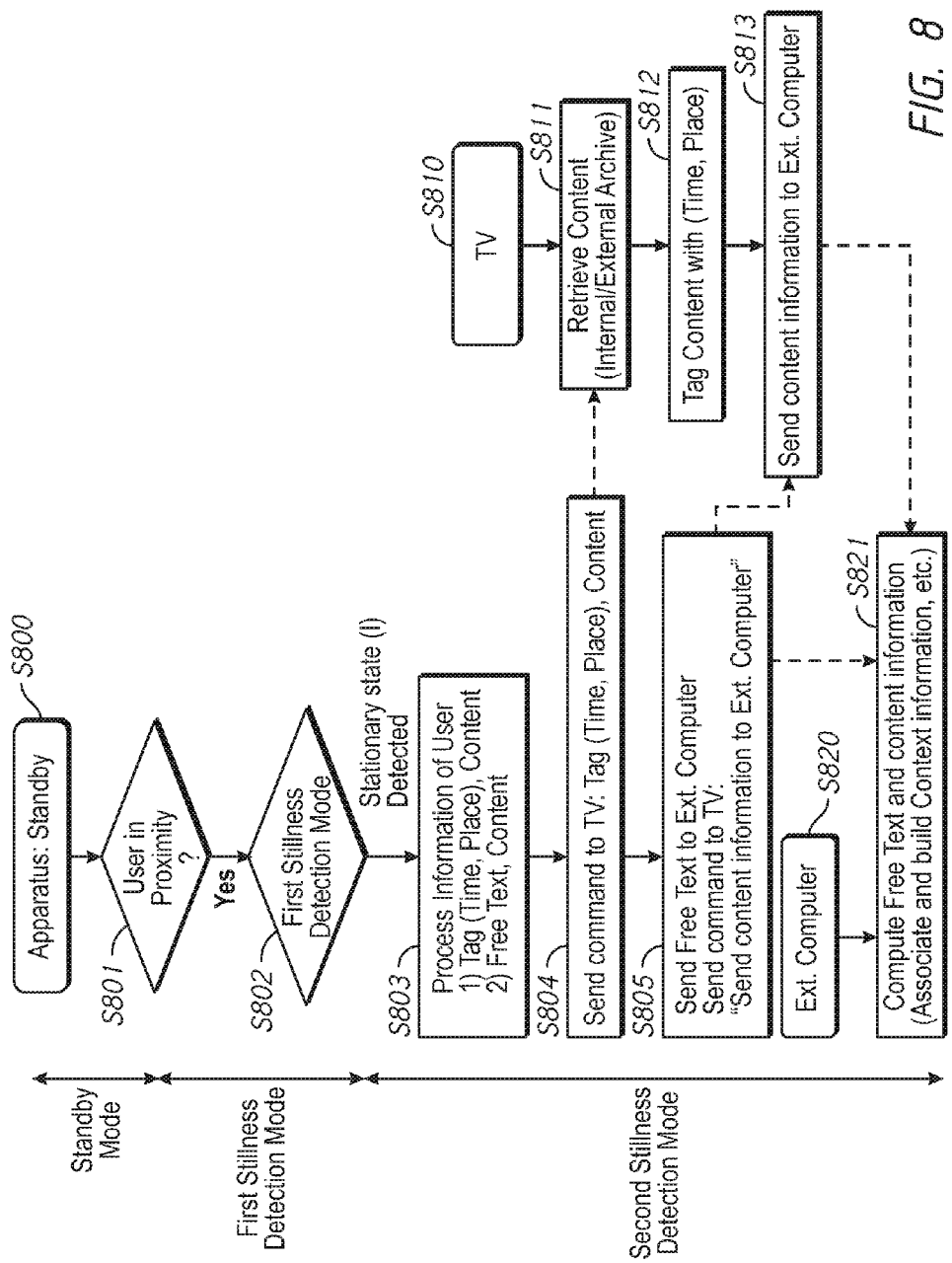
FIG. 8 is a flow diagram of a method of interfacing with a user including processing information associated with the user in a stationary state of an apparatus, in accordance with an embodiment of the present disclosure.

In another example, detection of stationary states of the apparatus 10 and extraction of information associated with the user 1 may be applied for various user interactions in collaboration with an external computer. FIG. 8 is a flow diagram of a method of interfacing with a user including processing information associated with the user in a stationary state of an apparatus, in accordance with an embodiment of the present disclosure. The apparatus 10 may be powered on to be in a standby state (S800). The proximity sensor 11 may detect the user 1 in proximity (S801) while the apparatus 10 is in a standby mode 100. The apparatus 10 may enter a first stillness detection mode, upon detection of the user 1 in proximity (S801), and the processor 12 may activate the motion sensor 13 to periodically provide motion data to the processor (S802). Following a triggering motion, also referred to herein as initialization movement (e.g., upon detection that he apparatus is being held by the user), the processor 12 may detect a stationary state I of the apparatus 10 based on the motion data in the first stillness detection mode, the apparatus 10 may enter a second stillness detection mode (S803), responsive to detection of the stationary state of the apparatus 10.

The processor 12 may process information associated with the user 1 (S803) received from the sensors/output devices 14 in the second stillness detection mode. For example, a result of processing the information associated with the user 1 may prompt the apparatus 10 to provide a "tag" command to control the external apparatus 16 that is a television (TV) to tag a content with a time and a place included in the information associated with the user 1. The content may be explicitly specified by the information associated with the user 1, or implicitly identified by a currently showing program or a currently recording program. The apparatus 10 may transmit a command "Tag" and tag information including the time, the place and the content information to the television via the wired/wireless communication device 15 (S804). The television in a standby state (S810) may receive the command "Tag" and the tag information from the apparatus 10, and may retrieve the content (e.g., a program, a video clip, an audio clip, etc.) or the content information (e.g., a "table of content (TOC)" information for a content item) internally or from an external archive (S811). The external archive may be local (e.g., hard disc recorder) or global (e.g., cloud storage, internet resources). Once the content or the content information is retrieved, the television may associate the content or the content information with the tag information (S812). Furthermore, continuous processing of the information associated with the user 1 may prompt the apparatus 10 may include extracting free text. The free text may be feeling, thoughts, ideas, etc. of the user 1 regarding the content. The apparatus 10 may transmit the free text to the external computer (S805). Simultaneously, the apparatus 10 may transmit an instruction to the television, causing the television to send content information regarding the content to the external compute (S805). For example, the transmission of the free text and the transmission of the instruction may be via the same wired/wireless communication device 15. For example, the transmission of the free text to the external computer may be via internet (e.g., wi-fi, LTE, etc.) and the transmission of the instruction to the television may be via infrared command transmission. The television may provide the content information to the external computer (S813). The external computer may receive the free text from the apparatus 10 and the content information from the television, and may obtain context information to regarding the free text and the content information. For example, the processor 12 may process the free text to extract internal information of the user 1, such as the feeling, thoughts, ideas, etc. of the user 1, and may associate the internal information of the user 1 with the content information. The external computer may store the association of the internal information of the user 1 and the content information and may further build the context information of the user 1 based on the stored sets of association of the internal information of the user 1 and the content information (S821). Although not described above, the apparatus 10 may extract free text without association with another external apparatus, and may process the free text in collaboration with the external computer.

Figure 9:
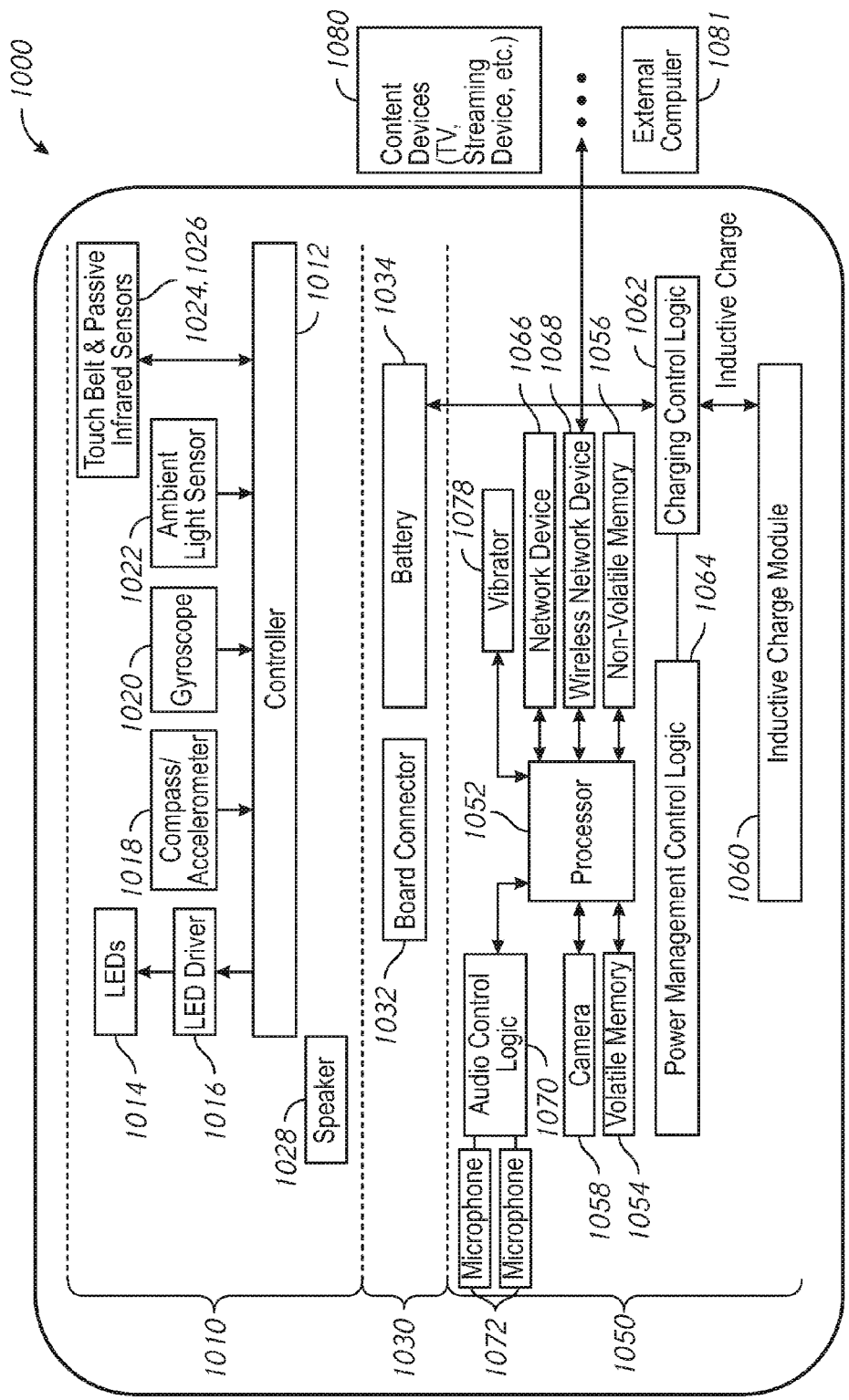
FIG. 9 is a block diagram of an apparatus, in accordance with an embodiment of the present disclosure.

FIG. 9 is a block diagram of an apparatus 1000, in accordance with an embodiment of the present disclosure. The apparatus 1000 may be used to implement the apparatus 900 of FIGS. 2A-2E. The apparatus 1000 may include an interface board 1010, a power region 1030, and a control board 1050. As described, each of the interface board 1010, power region 1030, and control board 1050 may be located in a lower portion of the apparatus 1000. The interface board 1010 may include a controller 1012 that may receive user data from one or more sensors of the interface board 1010. For example, the controller 1012 may be coupled to a compass/accelerometer 1018, a gyroscope 1020, an ambient light sensor 1022, a touch sensor 1024, and infrared sensors 1026, and receive data therefrom. Each of the sensors 1018, 1020, 1022, 1024 and 1026 may provide respective data to the controller 1012. The controller 1012 may in turn provide the data to a processor 1052 included in the control board 1050. The processor 1052 may be used to implement the processor 12 of FIG. 1. The processor 1052 may use the data to identify information associated with the user 1, as described herein. In some examples, the controller 1012 may filter and/or otherwise modify data received from the sensors prior to providing the data to the processor 1052.

As described, the touch sensor 1024 may be used to determine whether the user 1 is in physical contact with the apparatus 1000. In some examples, the compass/accelerometer 1018 and the gyroscope 1020 may be additionally or alternatively be used to determine whether the user 1 is in contact with the apparatus 1000. The gyroscope 1020, for instance, may provide signals indicating that the apparatus 1000 has been tilted as a result of the user 1 touching the apparatus 1000. In this manner, the apparatus 1000 may determine whether the user 1 is in physical contact with the apparatus 1000 even if the touch sensor 1024 does not detect any physical contact with the user 1 at a portion of the apparatus 1000 where the touch pad of the touch sensor 1024 is disposed. In some examples, a speed, a frequency or an amplitude of displacement which the apparatus 100 sways back and forth may be used to determine the manner in which the user 1 is in physical contact with the apparatus 1000. A lower speed, frequency or larger amplitude of displacement (due to larger swings) may, for instance, indicate a more forceful touch.

The interface board 1010 may further include an LED driver 1016 and LEDs 1014 that may provide visual responses to a user 1. For example, the controller 1012 may cause the LED driver 1016 to illuminate one or more of the LEDs 1014 to provide a specified light pattern of a particular visual response. The interface board 1010 may further include a speaker 1028 that may provide auditory responses to the user 1. Auditory responses may be based on one or more audio signals received from the audio control logic 1070, described in further detail below.

The power region 1030 may be located between the interface board 1010 and the control board 1050 and include a board connector 1032 and a battery 1034. The board connector 1032 may provide data between respective components of the interface board 1010 and the control board 1050. For example, the board connector 432 may provide signals from the audio control logic 1070 to the speaker 1028. For the sake of clarity, specific connections provided by the board connector 1032 are not shown in FIG. 10. The power region 1030 may further include a battery 1034 that may be applied to implement the battery 930 of FIGS. 2A-2E. The battery 434 may store and/or provide power to one or more components of the apparatus 1000.

The control board 1050 may include the processor 1052. Generally, the processor 1052 may govern operation of the apparatus 1000 and may execute one or more computer readable instructions stored in the non-volatile memory 1056 such that the apparatus 1000 may operate as described herein. The processor 1052 may receive data from one or more of the devices of the control board 1050. For example, the processor 1052 may receive data from the camera 1058, network device 1066, wireless network device 1068, and/or audio control logic 1070. The camera 1058 may provide visual data associated with the user 1, such as a facial expression or natural gesture of the user 1. The network device 1066 may communicate with one or more wired networks, such as a USB network or Ethernet network, and the wireless network device 1068 may communicate with one or more wireless networks. Accordingly, the network device 1066 and/or the wireless network device 1068 may allow the processor 1052 to communicate with one or more external apparatuses 1080 (e.g., content devices, such as a television, a streaming device, etc.) and an external computer 1081 using a wired or wireless network. The audio control logic 1070 may be coupled to one or more microphones 1072 and may receive audio data (e.g., voice data) associated with the user 1. The audio control logic 1070 may provide audio data to and receive audio data from the processor 1052. Audio data may be provided from the microphones 1072 to the processor 1052, and may be provided from the processor 1052 to the speaker 1028. In some examples, the audio control logic 1070 may include one or more analog-to-digital converters and digital-to-analog converters and/or may further include one or more audio filters or codecs. The control board 1050 may further include a vibrator 1078 that may provide vibration responses to the user 1. For example, the processor 1052 may cause the vibrator 1078 to vibrate in a particular manner during a vibrational response.

The control board 1050 may include power circuitry comprising an inductive charge module 1060, charging control logic 1062, and power management control logic 1064. During a charging sequence, the inductive charge module 1060 may be coupled to an external charging device, such as a charging mat or port (not shown) and provide the charge received from the charging mat to the charging control logic 462. In turn, the charging control logic 1062 may charge the battery 1034. When either the battery 1034 is fully charged, or the inductive charge module 1060 is no longer coupled to the external device, the charging control logic 1062 may terminate the charging sequence. The power management control logic 1064 may manage allocation of power to components of the apparatus 1000. In some examples, the apparatus 1000 may include a coil (not shown) for inductive charging. For example, the coil may be stacked with (e.g., over or under) a touch pad, such as the touch pad 908 of FIG. 2E.

In some examples, the apparatus 1000 may selectively enable one or more components according to a mode of the apparatus 1000. In this manner, the apparatus 1000 may increase power usage efficiency. By way of example, the apparatus 1000 may determine that a user 1 is not in proximity and enter a standby mode. In response, the processor 1052 may enter low power operation (e.g., in a standby state). In at least one embodiment, the power management control logic 1064 may cause the processor 1052 to enter low power operation, for instance, responsive to the user 1 not being in proximity to the apparatus 1000 for a particular amount of time. While the processor 1052 is in low power operation (e.g., in a standby state), the controller 412 and one or more proximity sensors of the apparatus 1000, such as the infrared sensors 1026 or microphones 1072, may continue to operate. Responsive to the one or more proximity sensors detecting that a user 1 is in proximity to the apparatus 1000, the processor 1052 may exit the low power operation and begin processing user data.

In some examples, other features and/or components of the apparatus 1000 may be selectively enabled as well. Speech analysis, for example, may be selectively enabled (e.g., by the processor 1052) based on whether the apparatus 1000 is in contact with the user 1 in a second stillness mode 120 in FIG. 2. In another example, the camera 1058 may be selectively enabled based on whether the apparatus 1000 is in contact with the user 1 in a second stillness mode 120 in FIG. 2. In some examples, the apparatus 1000 may select a mode based on whether the apparatus 1000 is charging. In response, the apparatus 1000 may selectively enable one or more features and/or components of the apparatus 1000. For example, the apparatus 1000 may remain connected to one or more available wireless networks while charging. Additionally or alternatively, the apparatus 1000 may transfer and/or backup data to an external computer 1081, when charging.

In some examples, the interface board 1010 and control board 1050 may each be an integrated circuit, and accordingly, respective components of the interface board 1010 and control board 1050 may be integrated. In other examples, one or more respective components may be separately installed and not integrated in either of the interface board 1010 and the control board 1050. Moreover, while particular components have been described as being located in the interface board 1010, the power region 1030, or the control board 1050, it will be appreciated that in other embodiments components of the apparatus 1000 may be arranged in other configurations. The compass/accelerometer 1018 and/or the gyroscope 1020, for instance, may be included in the control board 1050 and/or the microphones 1072 and the audio control logic 1070 may be located in the interface board 410.

Inventive aspects of the present disclosure are described further with references to the enumerated paragraphs below.

A1. A method of interfacing with a user, comprising:
detecting a user in proximity of an apparatus;
entering a first mode of the apparatus responsive to detection of the user in proximity;
receiving motion data from one or more sensors of the apparatus responsive to movement of the apparatus;
detecting a stationary state of the apparatus based on the motion data; and
entering a second mode responsive to detection of the stationary state.

A2. The method according to paragraph A1, wherein the one or more sensors include a motion sensor, the method further comprising activating the motion sensor responsive to entering the first mode.

A3. The method according to paragraph A1 or A2, wherein detecting the stationary state includes detecting lack of a motion of the apparatus for a predetermined period of time.

A4. The method according to any of paragraphs A1-A3, wherein the apparatus includes a touch sensor, and wherein detecting a user in proximity of the apparatus comprises detecting with a touch by the user with the touch sensor of the apparatus.

A5. The method according to any of paragraphs A1-A5, wherein the apparatus includes an infrared sensor, and wherein detecting a user in proximity of the apparatus comprises determining based on sensor data from the infrared sensor whether the user is within a predetermined range of the apparatus.

A6. The method according to any of paragraphs A1-A6, further comprising providing a response with the apparatus during the second mode.

A7. The method according to paragraph A6, wherein the response comprises providing a visual, auditory, or tactile response with the apparatus.

A8. The method according to paragraph A6 or A7, wherein the providing a response comprises:
transmitting a command to an external apparatus;
receiving return communication from the external apparatus responsive to the command, wherein the return communication is based on user data retrieved by the external apparatus; and
generating feedback by the apparatus based, at least in part, on the return communication.

A9. The method according to any of paragraphs A1-A8, further comprising processing information associated with the user while the apparatus is in the second mode.

A10. The method according to paragraph A9, wherein processing the information of the user during the stationary state of the apparatus comprises detecting one or more periods of the stationary state of the apparatus.

A11. The method according to paragraph A9 or A10, wherein the apparatus further comprises a microphone and a memory device, and wherein processing the information comprises detecting sounds from the user using the microphone, and recording audio data corresponding to the sounds on a memory device.

A12. The method according to paragraph A11, wherein the apparatus further comprises a processor, the method further comprising:

extracting information from the audio data by the processor;
generating an instruction to search content associated with the user and stored on an external apparatus, based on the extracted information; and
transmitting the instruction to the external apparatus.

A13. The method according to paragraph A12, further comprising generating an instruction to associate the extracted information with one or more content items from the content stored on the external apparatus, and transmitting the instruction to the external apparatus.

A14. The method according to paragraph A13, further comprising counting a number of occurrences of the extracted information in the audio data, and provide a weight for the extracted information based on the number, wherein the instruction to associate the extracted information with the content is based, at least in part, on the weight.

A15. The method according to any of paragraphs A1-A14, further comprising recording a sequence of states of the apparatus including one or more stationary states or non-stationary states occurring in the second mode.

A16. The method according to paragraph A15, further comprising determining a pattern of the sequence of states by comparing the sequence of states with a plurality of stored sequences.

A17. The method according to paragraph A16, wherein the pattern of the sequence of states is associated with pronation, supination, flexion, extension, or rotation of the apparatus.

A18. The method according to paragraph A16 or A17, further comprising storing the sequence of states in a database of sequences generated by the user, wherein the determining a pattern is based on the sequences in the database of sequences generated by the user.

A19. The method according to paragraph A18, wherein the determining a pattern is based on sequences in a pre-existing database of sequences.

A20. The method according to any of paragraphs A16-A19, further comprising generating a command to an external apparatus based on the pattern of the sequence of states and transmitting the command to the external apparatus.

A21. The method according to paragraph A20, further comprising identifying one of a plurality of external apparatuses based on the pattern of the sequence of states and transmitting the command to the identified external apparatus.

A22. An apparatus comprising:
a proximity sensor configured to detect a user in proximity of the apparatus;
a processor configured to cause the apparatus to enter a first mode responsive to detection of the user in proximity;
a motion sensor configured to provide motion data responsive to movement of the apparatus in the first mode; and
wherein the processor is configured to detect a stationary state of the apparatus based on the motion data and further configured to cause the apparatus to enter a second mode responsive to the detection of the stationary state.

A23. The apparatus according to paragraph A22, wherein the processor is configured to detect the stationary state, if the processor detects lack of a motion of the apparatus for a predetermined period of time.

A24. The apparatus according to paragraphs A22 or A23, wherein the proximity sensor is one of a passive infrared sensor, a capacitive sensor, a gyroscope, an accelerometer, a camera, a microwave sensor, an ultrasonic sensor, a laser based sensor, a photoelectric sensor, a plurality of microphones, a pressure sensor, a magnetic sensor, a thermal sensor, a radar, wireless communication functionality, or a combination thereof.

A25. The apparatus according to any of paragraphs A22-A24, wherein the motion sensor is either a gyroscope, an accelerometer, a camera, a passive infrared detector, an ultrasonic sensor, a capacitive sensor, a microphone, a photoelectric sensor, a thermal sensor, a pressure sensor, a magnetic sensor, a heart rate sensor, or a combination thereof.

A26. The apparatus according to any of paragraphs A22-A25, further comprising a memory device configured to record information associated with the user while the apparatus is in the second mode.

A27. The apparatus according to paragraph A26, further comprising at least one microphone configured to detect ambient sound in the second mode, wherein the memory device is configured to record the ambient sound, and wherein the processor is configured to extract the information associated with the user from the ambient sound.

A28. The apparatus according to paragraphs A26 or A27, further comprising a camera configured to capture a sequence of images of the user, wherein the memory device is configured to store the sequence of images of the user, and wherein the processor is configured to restore the sequence of images, to interpret a gesture of the user in the sequence of images, and further configured to extract the information associated with the user from the gesture of the user.

A29. The apparatus according to any of paragraphs A26-A28, wherein the motion sensor is further configured to capture a sequence of motion data of the user in the second mode, wherein the memory device is configured to store the sequence of motion data of the user, and wherein the processor is configured to restore the sequence of motion data, to interpret a gesture of the user in the sequence of motion data, and further configured to extract the information associated with the user from the gesture of the user.

A30. The apparatus according to any of paragraphs A22-A29, wherein the processor is configured to provide a response during the second mode.

A31. The apparatus according to paragraph A30, further comprising a wireless transmitter configured to transmit a command to an external apparatus based on the information associated with the user, the command being indicative of a function of the external apparatus.

A32. The apparatus according to paragraph A30 or A31, further comprising a laser emitter diode (LED) light, wherein the processor is configured to blink the LED light as the response, based on the information associated with the user.

A33. The apparatus according to any of paragraphs A30-A32, further comprising at least one speaker, wherein the processor is configured to cause the speaker to produce sound as the response, based on the information associated with the user.

A32. The apparatus according to paragraph A30 or A31, further comprising a light emitting diode (LED), wherein the processor is configured to blink the LED as the response, based on the information associated with the user.

A35. The apparatus according to any of paragraphs A22-A32, further comprising an enclosure made, at least in part, from wood.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

What is claimed is:

1. A method of interfacing with a user, comprising:
   detecting a user in proximity of an apparatus;
   entering a first stillness detection mode of the apparatus from a standby mode of the apparatus responsive to detection of the user in proximity;
   detecting initial movement of the apparatus;
   for a period of time following the initial movement, receiving motion data from one or more sensors of the apparatus responsive to the initial movement of the apparatus;
   processing the motion data to detect lack of movement of the apparatus following the initial movement;
   entering a second stillness detection mode responsive to the detected lack of movement; and
   providing a response with the apparatus during the second stillness detection mode.

2. The method of claim 1, wherein the one or more sensors include a motion sensor, the method further comprising activating the motion sensor responsive to entering the first mode.

3. The method of claim 1, wherein the apparatus includes a touch sensor, and wherein detecting a user in proximity of the apparatus comprises detecting a touch by the user with the touch sensor.

4. The method of claim 1, wherein the response comprises providing feedback to the user or transmitting a communication to an external apparatus.

5. The method of claim 1, wherein the providing a response comprises:
   transmitting a command to an external apparatus;
   receiving return communication from the external apparatus responsive to the command, wherein the return communication is based on user data retrieved by the external apparatus; and
   generating feedback by the apparatus based, at least in part, on the return communication.

6. The method of claim 1, further comprising:
   processing information associated with the user while the apparatus is in the second stillness detection mode,
   wherein processing the information of the user during the lack of movement of the apparatus includes detecting one or more periods of lack of movement of the apparatus.

7. The method of claim 6, wherein the apparatus further comprises a microphone and a memory device, and wherein processing the information comprises:
   detecting sounds from the user using the microphone;
   recording audio data corresponding to the sounds on a memory device;
   extracting information from the audio data by the processor;
   generating an instruction to search content associated with the user and stored on an external apparatus, based on the extracted information; and
   transmitting the instruction to the external apparatus.

8. The method of claim 7, further comprising:
   generating an instruction to associate the extracted information with one or more content items from the content stored on the external apparatus; and
   transmitting the instruction to the external apparatus.

9. The method of claim 1, further comprising recording a sequence of states of the apparatus including one or more stationary states or non-stationary states occurring in the second stillness detection mode.

10. The method of claim 9, further comprising:
    determining a pattern of the sequence of states by comparing the sequence of states with a plurality of stored sequences.

11. The method of claim 10, further comprising generating a command to an external apparatus based on the pattern of the sequence of states and transmitting the command to the external apparatus.

12. The method of claim 11, further comprising identifying one of a plurality of external apparatuses based on the pattern of the sequence of states and transmitting the command to the identified external apparatus.

13. An apparatus comprising:
    a proximity sensor configured to detect a user in proximity of the apparatus;
    a processor configured to cause the apparatus to enter a first stillness detection mode from a standby mode responsive to detection of the user in proximity and detect initial movement of the apparatus in the first stillness detection mode; and
    a motion sensor configured to provide motion data for a period of time following the initial movement responsive to the initial movement of the apparatus in the first stillness detection mode,
    wherein the processor is configured to process the motion data to detect lack of movement of the apparatus following the initial movement, further configured to cause the apparatus to enter a second stillness detection mode responsive to the detection of the lack of movement, and further configured to cause the apparatus to provide a response during the second stillness detection mode.

14. The apparatus of claim 13, further comprising:
    a memory device configured to record information associated with the user while the apparatus is in the second stillness detection mode; and
    at least one microphone configured to detect ambient sound in the second stillness detection mode,
    wherein the memory device is configured to record the ambient sound, and
    wherein the processor is configured to extract the information associated with the user from the ambient sound.

15. The apparatus of claim 13, further comprising:
    a memory device configured to record information associated with the user while the apparatus is in the second stillness detection mode; and
    a camera configured to capture a sequence of images of the user,
    wherein the memory device is configured to store the sequence of images of the user, and
    wherein the processor is configured to restore the sequence of images, to interpret a gesture of the user in the sequence of images, and further configured to extract the information associated with the user from the gesture of the user.

16. The apparatus of claim 13, further comprising:
a memory device configured to record information associated with the user while the apparatus is in the second stillness detection mode,
wherein the motion sensor is further configured to capture a sequence of motion data of the user in the second stillness detection mode,
wherein the memory device is configured to store the sequence of motion data of the user, and
wherein the processor is configured to restore the sequence of motion data, to interpret a gesture of the user in the sequence of motion data, and further configured to extract the information associated with the user from the gesture of the user.

17. The apparatus of claim 13, wherein the processor is configured to provide feedback to the user or transmit a communication to an external apparatus during the second stillness detection mode.

18. The apparatus of claim 17, further comprising a wireless transmitter configured to transmit a command to an external apparatus based on the information associated with the user, the command being indicative of a function of the external apparatus.

19. The apparatus of claim 17, further comprising a light emitting diode (LED), wherein the processor is configured to blink the LED as the response, based on the information associated with the user.

20. The apparatus of claim 17, further comprising at least one speaker, wherein the processor is configured to cause the speaker to produce sound as the response, based on the information associated with the user.

21. The apparatus of claim 17, further comprising an enclosure and a vibrator, wherein the processor is configured to cause the vibrator to vibrate the enclosure as the response, based on the information associated with the user.

22. The apparatus of claim 13, further comprising an enclosure made, at least in part, from wood.

* * * * *